United States Patent
Nishiguchi

(10) Patent No.: US 9,608,914 B2
(45) Date of Patent: Mar. 28, 2017

(54) INFORMATION PROCESSING APPARATUS AND INFORMATION PROCESSING METHOD

(71) Applicant: FUJITSU LIMITED, Kawasaki-shi, Kanagawa (JP)

(72) Inventor: Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 14/639,324

(22) Filed: Mar. 5, 2015

(65) Prior Publication Data

US 2015/0281093 A1 Oct. 1, 2015

(30) Foreign Application Priority Data

Mar. 31, 2014 (JP) ................. 2014-074778

(51) Int. Cl.
| | |
|---|---|
| H04J 1/16 | (2006.01) |
| H04L 12/803 | (2013.01) |
| H04L 12/707 | (2013.01) |
| H04L 29/08 | (2006.01) |
| H04L 29/14 | (2006.01) |

(52) U.S. Cl.
CPC ............ *H04L 47/125* (2013.01); *H04L 45/22* (2013.01); *H04L 67/28* (2013.01); *H04L 69/40* (2013.01)

(58) Field of Classification Search
CPC ................. H04L 45/28; H04L 41/0654; H04L 2012/5627; H04L 41/0668; H04L 1/22; H04L 43/50; H04L 43/00; H04J 3/14; H04B 10/0771
USPC ................ 370/216, 219, 220, 242, 230, 235
See application file for complete search history.

(56) References Cited

U.S. PATENT DOCUMENTS

| | | | |
|---|---|---|---|
| 7,370,102 B1 | 5/2008 | Chu et al. | |
| 2004/0221207 A1* | 11/2004 | Yokota | ............... G06F 11/2023 714/48 |
| 2006/0271674 A1 | 11/2006 | Harada | |

(Continued)

FOREIGN PATENT DOCUMENTS

| | | |
|---|---|---|
| EP | 1575218 | 9/2005 |
| JP | 2006-330973 | 12/2006 |
| WO | 2006/057040 | 6/2006 |

OTHER PUBLICATIONS

The Extended European Search Report of European Patent Application No. 15157030.6 dated Sep. 1, 2015.

*Primary Examiner* — Brenda H Pham
(74) *Attorney, Agent, or Firm* — Fujitsu Patent Center

(57) ABSTRACT

The information processing apparatus relays a communication between a server providing a service and a terminal provided with the service. The information processing apparatus includes a memory and a processor. The processor executing a process that causes the information processing apparatus to perform receiving a service interruption notification and a service restarting notification of the service provided by the server from a device to monitor an operation state of the service, perform storing data, to a hold unit on the memory, to be transmitted to the server from the terminal when the receiving receives the service interruption notification of the service provided by the server, and perform transmitting the data stored in the hold unit to the server when the receiving receives the service restarting notification of the service provided by the server.

14 Claims, 40 Drawing Sheets

(56) References Cited

U.S. PATENT DOCUMENTS

2007/0213064 A1    9/2007  Togahara
2008/0031239 A1    2/2008  Kapoor et al.
2010/0077024 A1    3/2010  Yun
2012/0023378 A1*   1/2012  Nomura .............. G06F 11/0709
                                                        714/48

* cited by examiner

FIG. 11

| CONVERSION TARGET URL FIELD | CONVERSION TARGET ARGUMENT FIELD | CLIENT FIELD | PRE-CONVERTING VALUE FIELD | POST-CONVERTING VALUE FIELD |
|---|---|---|---|---|
| http://192.168.1.10/service1 | id | 192.168.1.20 | 1234 | 1234 |
|  |  | 192.168.1.22 | 1240 | 1251 |
| http://192.168.1.10/service1/sub | subid | 192.168.1.20 | 1 | 1 |
|  |  | 192.168.1.22 | 1 | 2 |

| | 206a | 206b | 206c | 206d |
|---|---|---|---|---|
| | CLIENT FIELD | URL FIELD | METHOD FIELD | REQUEST FIELD |
| | 192.168.1.20 | http://192.168.1.10/service1 | POST | {"name":"user1","pass":"xxx"} |
| | 192.168.1.22 | http://192.168.1.10/service1/sub?id=1240&subid=1 | POST | {"device":"device1"} |

206

| MANAGEMENT TARGET URL FIELD | METHOD FIELD | CONVERSION TARGET URL FIELD | CONVERSION TARGET ARGUMENT FIELD | SESSION FLAG FIELD |
|---|---|---|---|---|
| http://192.168.1.10/service1 | POST | http://192.168.1.10/service1 | id | true |
| http://192.168.1.10/service1/sub | POST | http://192.168.1.10/service1/sub | subid | |
| http://192.168.1.10/service1/sub/func | POST | | | |
| http://192.168.1.10/service1/sub/lock | GET | | | |

| SESSION FIELD | URL FIELD | ARGUMENT FIELD | METHOD FIELD | REQUEST FIELD | RESPONSE FIELD |
|---|---|---|---|---|---|
| id=1234 | http://192.168.1.10/service1 | | POST | {"name":"user1", "pass":"xxx"} | {"id":"1234"} |
| id=1234 subid=1 | http://192.168.1.10/service1/sub | id | POST | {"device":"device1"} | {"subid":"1"} |
| id=1234 id=1 | http://192.168.1.10/service1/sub/func | id subid | POST | {"data":"test"} | {"result":"success"} |
| id=1234 id=1 | http://192.168.1.10/service1/sub/lock | id subid | GET | | {"result":"success"} |

| SESSION FIELD | URL FIELD | ARGUMENT FIELD | METHOD FIELD | REQUEST FIELD | RESPONSE FIELD |
|---|---|---|---|---|---|
| id=1240 | http://192.168.1.10/ service1 | | POST | {"name":"user2", "pass":"yyy"} | {"id":"1240"} |
| id=1240 subid=1 | http://192.168.1.10/ service1/sub | id | POST | {"device":"device2"} | {"subid":"1"} |
| id=1240 id=1 | http://192.168.1.10/ service1/sub/func | id subid | POST | {"data":"test"} | {"result":"success"} |

| CONVERSION TARGET URL FIELD 204a | CONVERSION TARGET ARGUMENT FIELD 204b | CLIENT FIELD 204c | PRE-CONVERTING VALUE FIELD 204d | POST-RESTORING VALUE FIELD 212e |
|---|---|---|---|---|
| http://192.168.1.10/service1 | id | 192.168.1.20 | 1234 | 1234 |
|  |  | 192.168.1.22 | 1240 | 1251 |
| http://192.168.1.10/service1/sub | subid | 192.168.1.20 | 1 | 1 |
|  |  | 192.168.1.22 | 1 | 2 |

212

| | URL FIELD | ARGUMENT FIELD | METHOD FIELD | REQUEST FIELD |
|---|---|---|---|---|
| (1) | http://192.168.1.10/service1/sub/lock | id<br>subid | DELETE | |
| (2) | http://192.168.1.10/service1/sub/func | id<br>subid | POST | {"data":"null"} |
| (3) | http://192.168.1.10/service1/sub | id | DELETE | |
| (4) | http://192.168.1.10/service1 | | DELETE | |

FIG.24B1

■IP ADDRESS: 192.168.1.20

| URL FIELD | ARGUMENT FIELD | METHOD FIELD | REQUEST FIELD |
|---|---|---|---|
| http://192.168.1.10/service1/sub/lock | id=1234 subid=1 | DELETE | |
| http://192.168.1.10/service1/sub/func | id=1234 subid=1 | POST | {"data":"null"} |
| http://192.168.1.10/service1/sub | id=1234 subid=1 | DELETE | |
| http://192.168.1.10/service1 | id=1234 | DELETE | |

■ IP ADDRESS: 192.168.1.22

| URL FIELD | ARGUMENT FIELD | METHOD FIELD | REQUEST FIELD |
|---|---|---|---|
| http://192.168.1.10/service1/sub/lock | id=1251<br>subid=2 | DELETE | |
| http://192.168.1.10/service1/sub/func | id=1251<br>subid=2 | POST | {"data":"null"} |
| http://192.168.1.10/service1/sub | id=1251<br>subid=2 | DELETE | |
| http://192.168.1.10/service1 | id=1251 | DELETE | |

■ IP ADDRESS: 192.168.1.20

| URL FIELD | ARGUMENT FIELD | METHOD FIELD | REQUEST FIELD | RESPONSE FIELD |
|---|---|---|---|---|
| http://192.168.1.10/service1 | | POST | {"name":"user1","pass":"xxx"} | {"id":"1252"} |
| http://192.168.1.10/service1/sub | id=1252 | POST | {"device":"device1"} | {"subid":"2"} |
| http://192.168.1.10/service1/sub/func | id=1252 subid=2 | POST | {"data":"test"} | {"result":"success"} |
| http://192.168.1.10/service1/sub/lock | id=1252 subid=2 | GET | | {"result":"success"} |

■IP ADDRESS: 192.168.1.22

| URL FIELD | ARGUMENT FIELD | METHOD FIELD | REQUEST FIELD | RESPONSE FIELD |
|---|---|---|---|---|
| http://192.168.1.10/service1 | | POST | {"name":"user2","pass":"yyy"} | {"id":"1253"} |
| http://192.168.1.10/service1/sub | id=1253 | POST | {"device":"device2"} | {"subid":"3"} |
| http://192.168.1.10/service1/sub/func | id=1253 subid=3 | POST | {"data":"test"} | {"result":"success"} |

| CONVERSION TARGET URL FIELD | CONVERSION TARGET ARGUMENT FIELD | CLIENT FIELD | PRE-CONVERTING VALUE FIELD | POST-CONVERTING VALUE FIELD |
|---|---|---|---|---|
| http://192.168.1.10/service1 | id | 192.168.1.20 | 1234 | 1252 |
| | | 192.168.1.22 | 1240 | 1253 |
| http://192.168.1.10/service1/sub | subid | 192.168.1.20 | 1 | 2 |
| | | 192.168.1.22 | 1 | 3 |

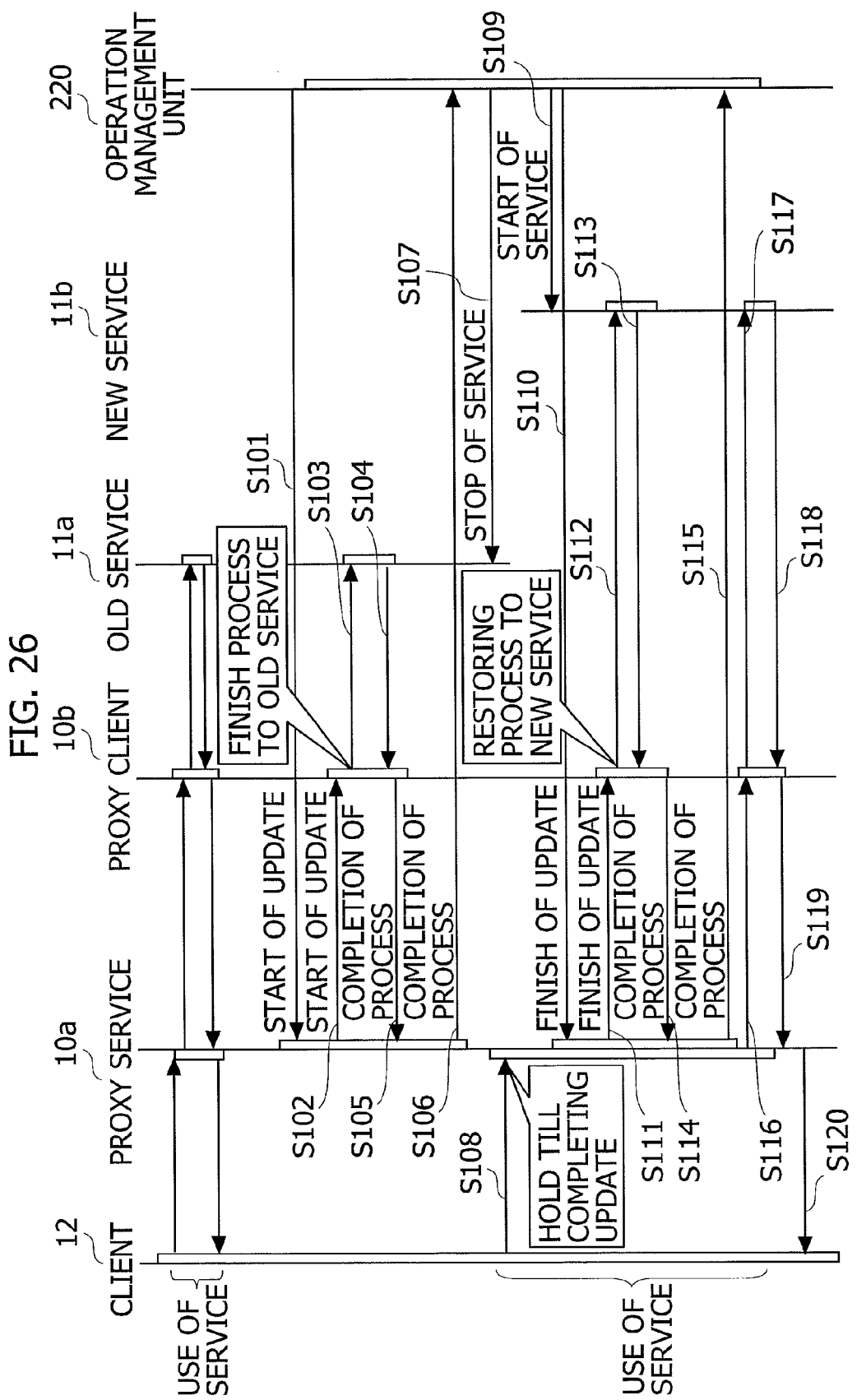

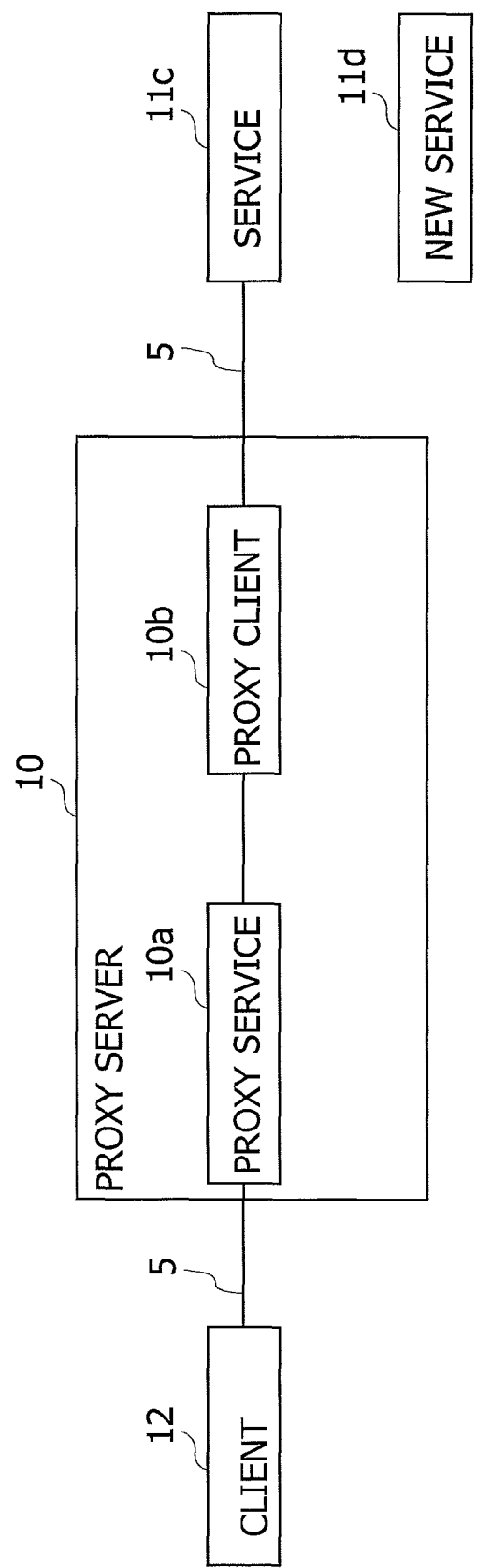

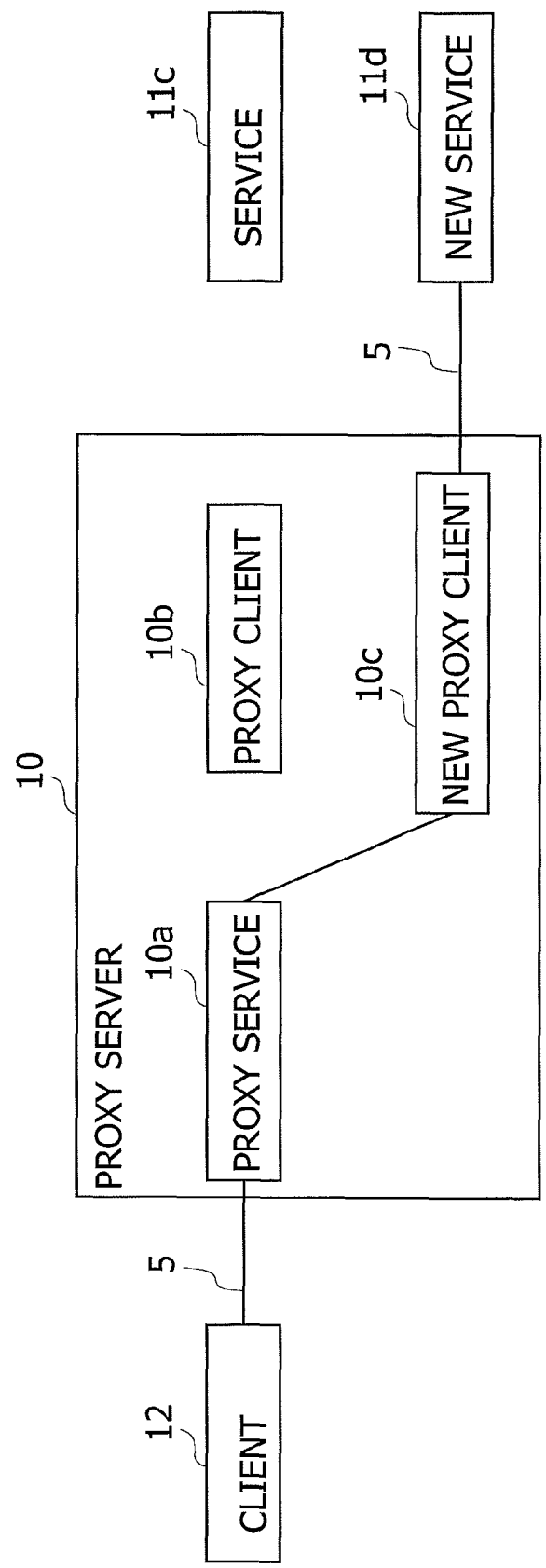

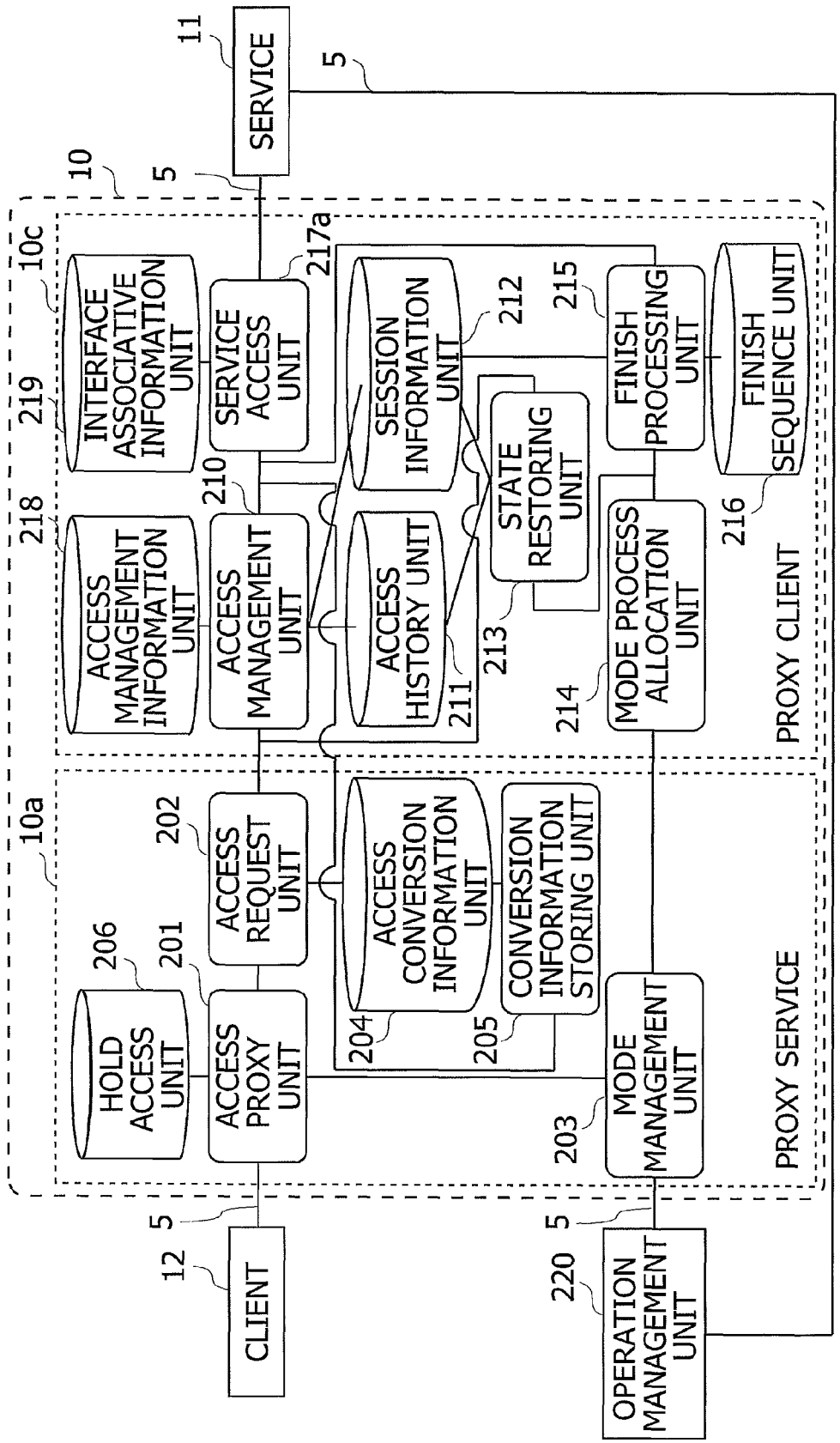

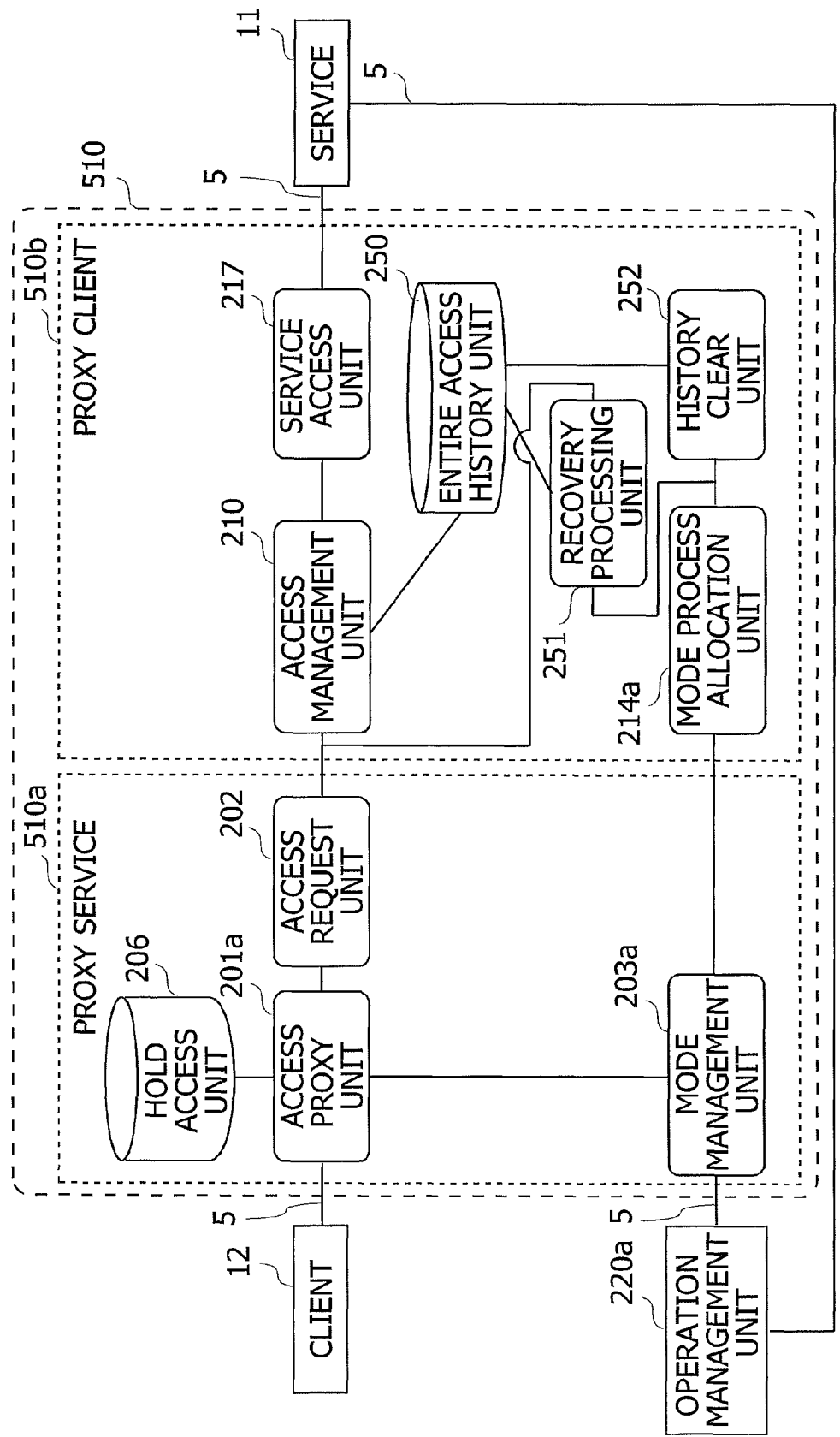

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2014-074778, filed on Mar. 31, 2014, the entire contents of which are incorporated herein by reference.

FIELD

The embodiments discussed herein are related to an information processing apparatus and an information processing method.

BACKGROUND

A variety of services are provided via a network by use of computers. This type of service is exemplified by an online shopping site or a video hosting site. It is desirable in this type of service that a service interruption period disabling the service to be utilized is as short as possible. However, the service being provided is interrupted as the case may be due to a maintenance work exemplified by applying modification patch programs to an Operating System (OS) and various categories of applications or due to a hardware fault in operating the computer. Such being the case, a restraint of the service interruption involves taking a measure to redundantly configure the computers that provide the services. The redundantly-configured computers enable the services to be provided from another active computer even when one computer is stopped due to the maintenance.

DOCUMENT OF PRIOR ART

Patent Document

[Patent document 1] Japanese Laid-open Patent Publication No. 2006-330973
[Patent document 2] International Publication Pamphlet No. WO2006/057040

SUMMARY

One aspect of a technology of the disclosure is exemplified by an information processing apparatus that follows.

The information processing apparatus relays a communication between a server providing a service and a terminal provided with the service. The information processing apparatus includes a memory and a processor. The processor executing a process that causes the information processing apparatus to perform receiving a service interruption notification and a service restarting notification of the service provided by the server from a device to monitor an operation state of the service, perform storing data, to a hold unit on the memory, to be transmitted to the server from the terminal when the receiving receives the service interruption notification of the service provided by the server, and perform transmitting the data stored in the hold unit to the server when the receiving receives the service restarting notification of the service provided by the server.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 11 is a diagram illustrating items of information stored in an access conversion information unit;
FIG. 12 is a diagram illustrating items of information stored in a hold access unit;
FIG. 14A is a diagram illustrating items of information stored in an access history unit;
FIG. 14B is a diagram illustrating items of information stored in an access history unit;
FIG. 15 is a diagram illustrating items of information stored in a session information unit;
FIG. 24B1 is a diagram illustrating contents of data generated by the finish processing unit;
FIG. 24B2 is a diagram illustrating contents of data generated by the finish processing unit;
FIG. 25B1 is a diagram illustrating the contents of the data generated by the STATE restoring unit and contents of response data given from a service with respect to the generated data;

FIG. 25B2 is a diagram illustrating the contents of the data generated by the STATE restoring unit and contents of response data given from a service with respect to the generated data;

FIG. 25C is a diagram illustrating the access conversion information unit after restoring the STATE;

FIG. 26 is a sequence chart illustrating a processing flow of when updating the service;

FIG. 27 is a diagram illustrating a state before an update of a proxy client in a modified example;

FIG. 29 is a diagram illustrating a post-updating state of the proxy client in the modified example;

FIG. 30A is a diagram illustrating function blocks of the proxy server after the update in the modified example;

FIG. 31 is a diagram illustrating function blocks in a second embodiment;

DESCRIPTION OF EMBODIMENTS

A large number of computers being actually operated are not redundantly configured. Accordingly, when providing the services from the non-redundantly-configured computers or from the computers not based on a premise of the redundant configuration, a difficulty arises to restrain the services from being interrupted by a redundant configuring technology. Under such circumstance, one aspect of a technology of the disclosure is a technology for restraining the interruption of the services provided by the computers without being redundantly-configured.

An information processing apparatus according to one embodiment will hereinafter be described with reference to the drawings. A configuration of the following embodiment is an exemplification, and the present apparatus is not limited to the configuration of the embodiment.

First Comparative Example

Figure 1:
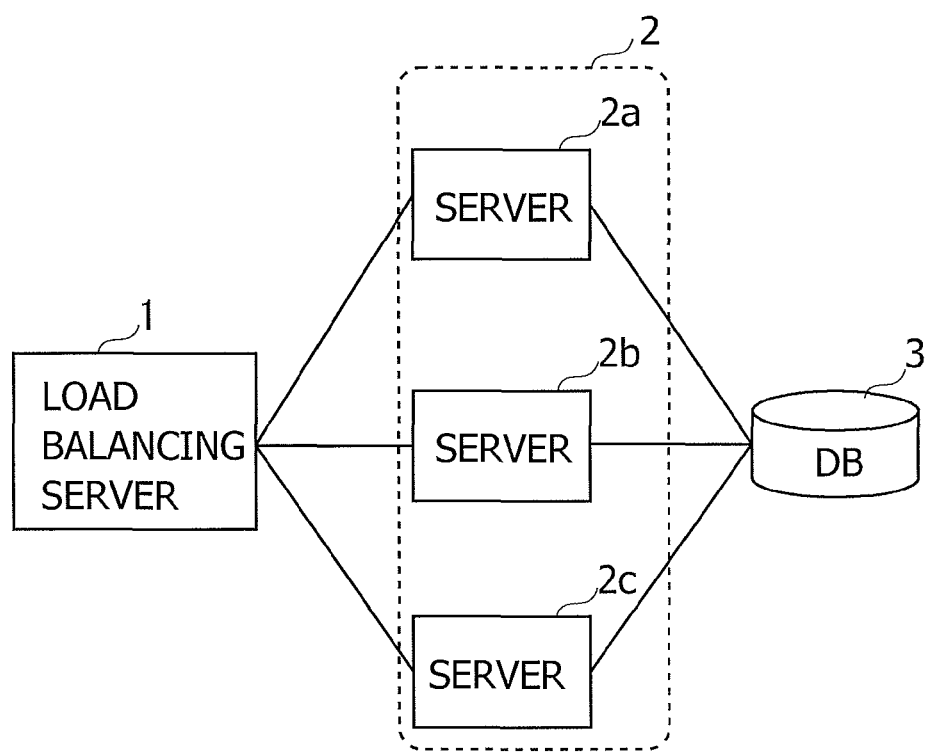
FIG. 1 is a diagram illustrating a system in a first comparative example.

FIG. 1 is a diagram illustrating a system in a comparative example. FIG. 1 depicts a load balancing server 1, services 2 and a database 3. The services 2 are provided by redundantly-configured servers 2a-2c. The load balancing server 1 distributes accesses to the services 2 from users to the servers 2a-2c. The DB 3 is a database shared among the servers 2a-2c. The first comparative example exemplifies maintaining in order the servers providing the redundantly-configured servers 2a-2c, i.e., exemplifies so-called rolling maintenance.

Figure 2:
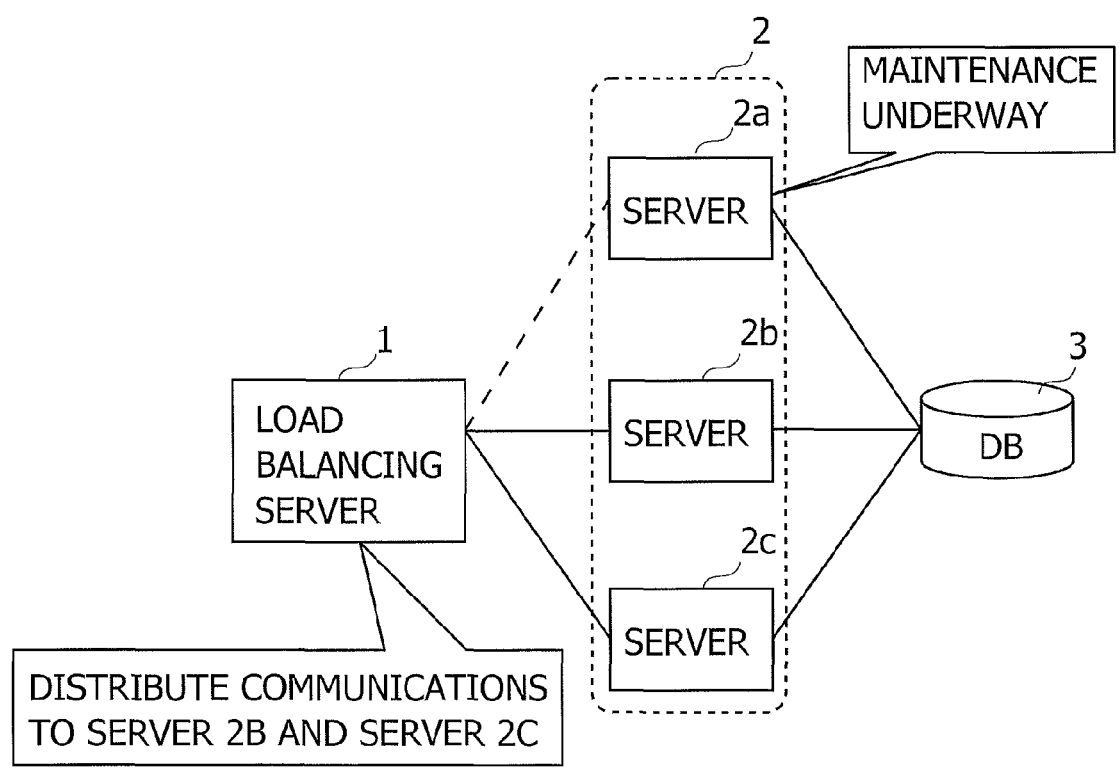
FIG. 2 is a diagram illustrating a state when performing maintenance of the system in the first comparative example.

FIG. 2 is a diagram illustrating a state when performing the maintenance of the system in the first comparative example. FIG. 2 illustrates that the server 2a stops providing the service for the reason such as the maintenance. Therefore, the load balancing server 1 distributes the accesses from the users to the server 2b or the sever 2c. Upon finishing the maintenance of the server 2a, the server 2a restarts providing the service. T hereafter, the maintenance of the server 2b is started. Thereafter, also when performing the maintenance of the server 2b and the server 2c, the load balancing server 1 distributes the accesses from the users to the server not undergoing the maintenance. Namely, the redundantly-configured servers receive the maintenance in order. The load balancing server 1 distributes the accesses from the users to the server(s) not being implemented with the maintenance.

The first comparative example is that the load balancing server 1 distributes the accesses from the users to the server not undergoing the maintenance. As a result, the first comparative example works to restrain interruption of the service to the user. The first comparative example does not, however, have any mechanism for sharing STATE indicating a state of the service. It is therefore difficult to apply the rolling maintenance in the first comparative example to a service for managing the STATE of a log-in process etc. The service for managing the STATE of a log-in process etc. will hereinafter be termed a stateful service in the present specification.

Second Comparative Example

A second comparative example will exemplify a system configured to switch over logic of the service within the service. The system in the second comparative example enables the logic to be replaced within the service. The logic of the service is defined as, e.g., a program module for providing the service. The second comparative example will discuss a system to be updated by adding updated logic to the service and by switching over the logic. The system in the second comparative example will hereinafter be described with reference to FIGS. 3-5.

Figure 3:
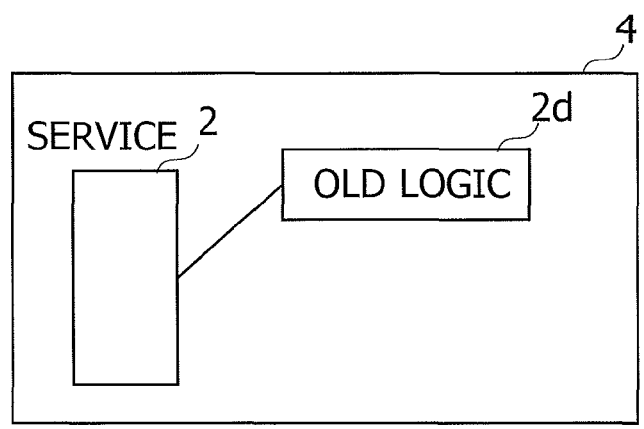
FIG. 3 is a diagram illustrating the system in a second comparative example.

FIG. 3 is a diagram illustrating the system in the second comparative example. FIG. 3 depicts a server 4, the service 2 and old logic 2d. The old logic 2d is defined as a program for providing the service 2.

Figure 4:
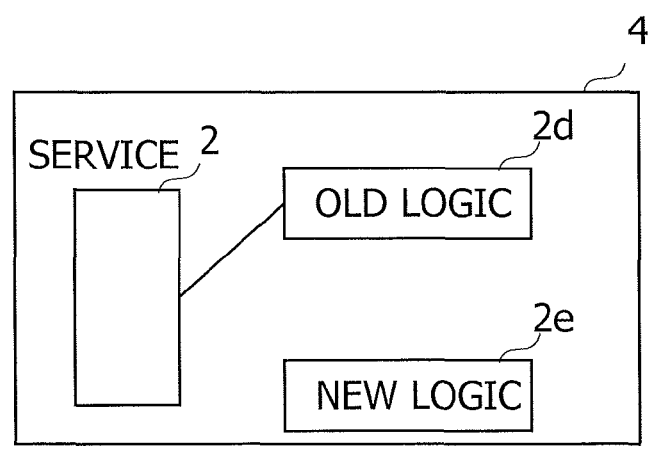
FIG. 4 is a diagram illustrating the system configured to provide a service on the basis of old logic.

FIG. 4 is a diagram illustrating a system that provides the service 2 by the old logic 2d. In FIG. 4, new logic 2e is added to the server 4. The new logic 2e is defined as a program configured to improve the function of the old logic 2d.

Figure 5:
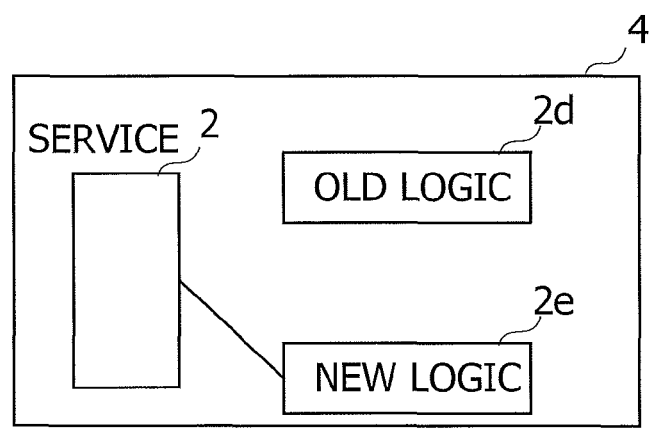
FIG. 5 is a diagram illustrating the system configured to provide the service with switchover to new logic.

FIG. 5 is a diagram illustrating a system that provides the service 2 with logic-switchover to the new logic 2e. In FIG. 5, the program to provide the service 2 is switched over to the new logic 2e from the old logic 2d. In the second comparative example, the server 4 incorporates the new logic 2e in advance before the logic-switchover. As a result, the system in the second comparative example can restrain the interruption of the service to the user even when the logic-switchover occurs. The system in the second comparative example does not, however, have any mechanism for sharing the STATE between the new logic and the old logic. Hence, it is difficult to apply the system implementing a logic-switchover function to the stateful service.

Third Comparative Example

A third comparative example will discuss a system configured to share the STATE within the services. The system in the third comparative example is configured to add a mechanism for sharing the STATE to the system in the first comparative example. The components being common to those of the system in the first comparative example are marked with the same numerals and symbols, and the explanations thereof are omitted. The third comparative example will hereinafter be described with reference to FIGS. 6 and 7.

Figure 6:
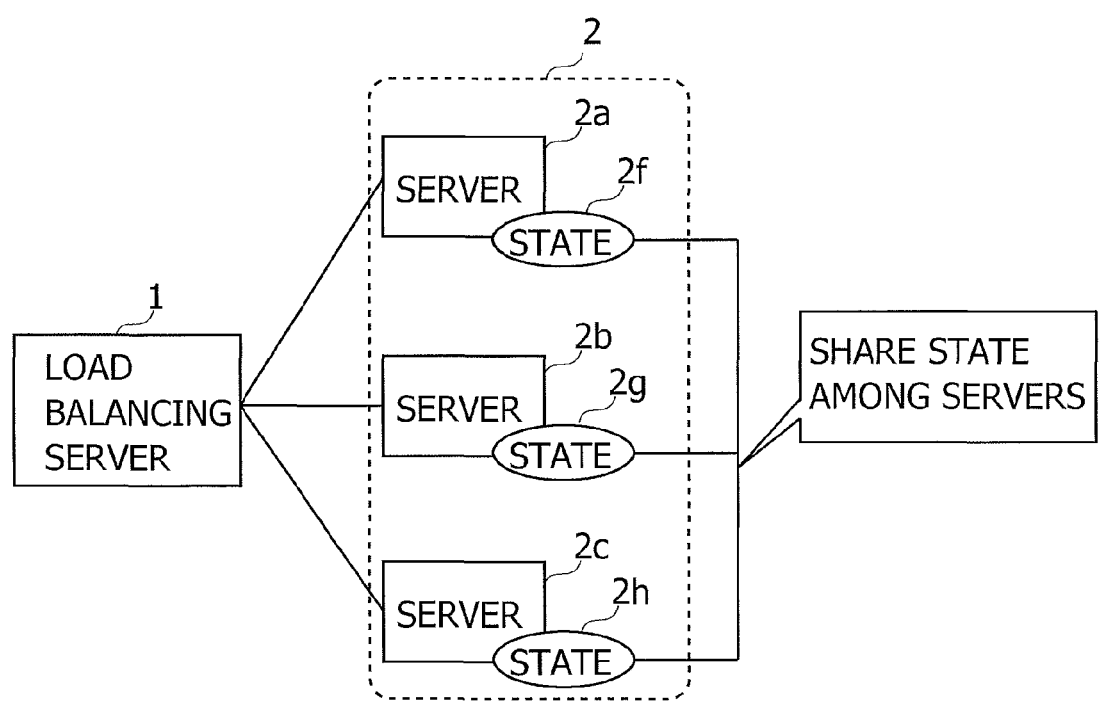
FIG. 6 is a diagram illustrating the system in a third comparative example.

FIG. 6 is a diagram illustrating the system in the third comparative example. FIG. 6 depicts the load balancing server 1 and the services 2. STATEs 2f-2h are respectively shared among the servers 2a-2c in the third comparative example. When sharing the STATEs, it may be sufficient that items of STATE information are stored in, e.g., a storage device shared among the servers 2a-2c.

Figure 7:
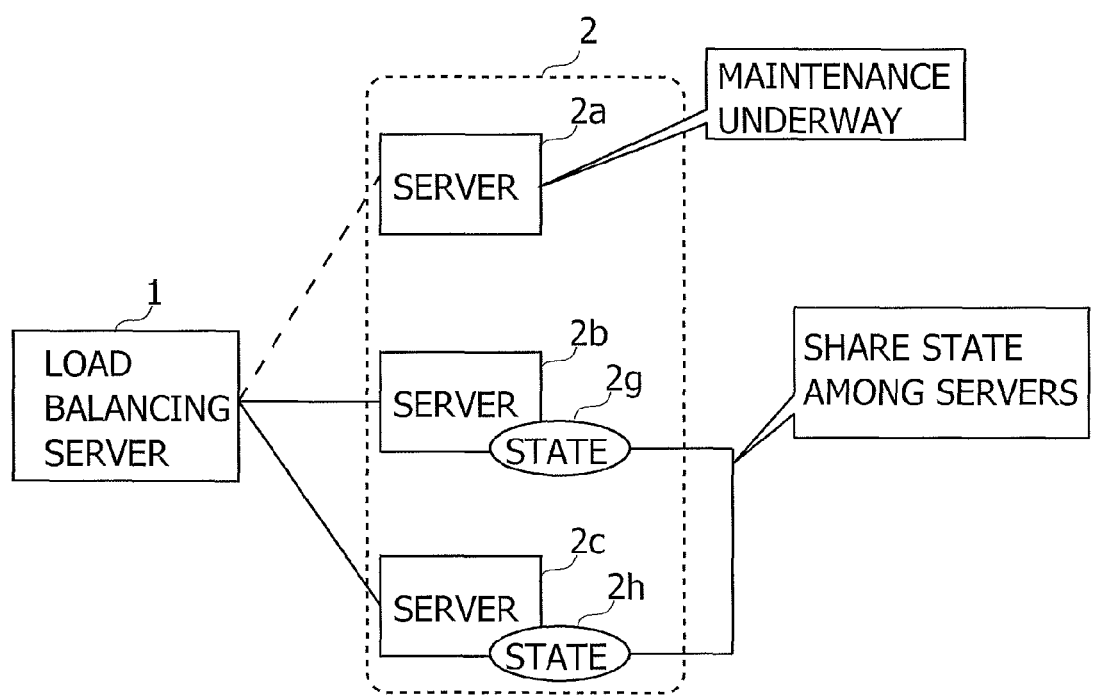
FIG. 7 is a diagram illustrating a state when performing the maintenance of the system in the third comparative example.

FIG. 7 is a diagram illustrating a state when performing the maintenance in the system of the third comparative example. FIG. 7 illustrates that the server 2a interrupts providing the service due to the maintenance thereof. However, the servers 2b-2c can take over the STATE of the server 2a because of sharing the service STATE among these servers.

In the third comparative example, the STATEs are shared among the servers 2a-2c. With this sharing, even when allocating the accesses from the users to other server during the maintenance, it is feasible to continue the process such as the log-in process using the STATE. The system in the third comparative example can be therefore applied to the stateful service.

Each of the comparative examples described above is based on the premise of the redundantly-configured servers for providing the services or the redundantly-configured logic. It is therefore difficult to apply the system of each comparative example to a system in which the services are provided without being redundantly-configured.

First Embodiment

A first embodiment will be described with reference to FIGS. 8 through 26. In the first embodiment, a proxy server is installed between a client terminal and a server to provide the services. The proxy server is one example of "an information processing apparatus to relay communications between a server to provide a service and a terminal provided with the service from the server". During the interruption of providing the service, the proxy server holds data transmitted from the client terminal. Upon restarting providing the service, the proxy server transmits the held data to the server. The first embodiment takes up a service update operation by way of one example of the service interruption.

Figure 8:
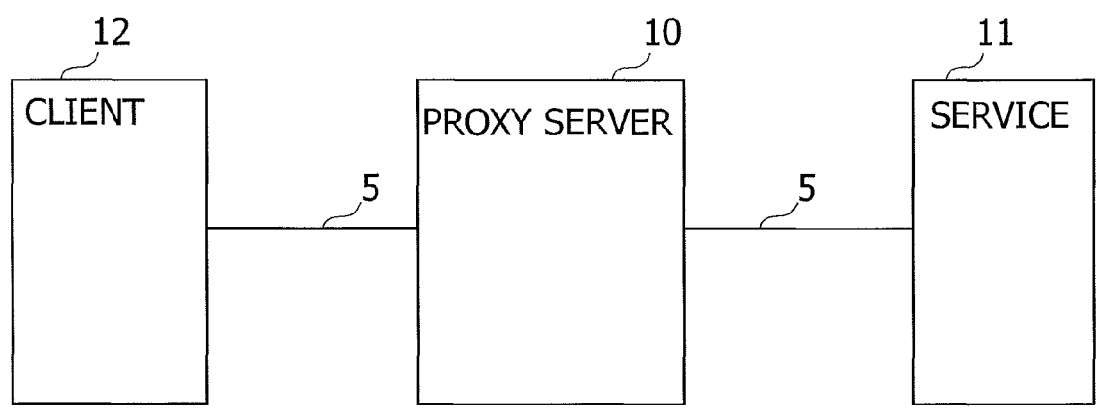
FIG. 8 is a diagram illustrating system architecture in a first embodiment.

FIG. 8 is a diagram illustrating system architecture in the first embodiment. FIG. 8 illustrates a proxy server 10, a service 11, a client 12 and a network environment 5. The proxy server 10, the server to provide the service 11 and the client 12 are interconnected via the network environment 5. The proxy server 10 is installed on a communication path between the client 12 and the service 11. The proxy server 10 holds the data transmitted from the client 12 to the service 11 when performing the maintenance of the service 11. The service 11 provides various types of services to the client 12. The client 12 is provided with the services from the service 11. The proxy server 10, the server to provide the service 11 and the client 12 are the information processing apparatuses. The network environment 5 is a communication path to interconnect the variety of information processing apparatuses. The network environment 5 is exemplified by, e.g., the Internet.

The client 12 is the information processing apparatus. The client 12 accesses the service 11 via the proxy server 10.

The service 11 is provided by the server. The server is the information processing apparatus. The service 11 provides the services to the client 12. The service 11 is defined as a Web service provided by, e.g., a Web server.

The proxy server 10 is the information processing apparatus. The proxy server 10 is installed on the communication path between the client 12 and the server to provide the service 11. The proxy server 10 conceals the interruption of the service 11 due to the update etc. from the client 12.

The network environment 5 interconnects the proxy server 10, the server to provide the service 11 and the client 12. The network environment 5 may be a wired network and may also be a wireless network. The network environment 5 is exemplified such as the Internet, a Local Area Network (LAN), a Virtual private Network (VPN), a wireless LAN and a telephone line for mobile phone.

Figure 9:
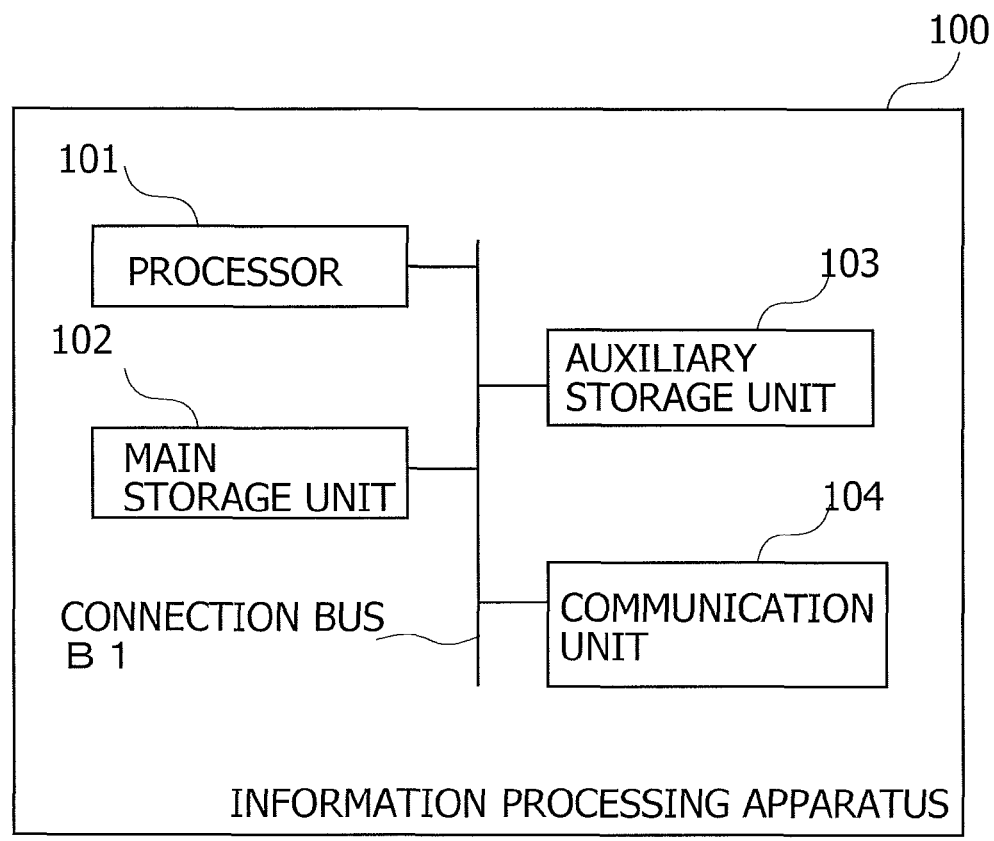
FIG. 9 is a diagram illustrating hardware architecture of an information processing apparatus.

FIG. 9 is a diagram illustrating hardware architecture of an information processing apparatus 100. The information processing apparatus 100 includes, a processor 101, a main storage unit 102, an auxiliary storage unit 103, a communication unit 104 and a connection bus B1. The processor 101, the main storage unit 102, the auxiliary storage unit 103 and the communication unit 104 are interconnected via the connection bus B1. The information processing apparatus 100 can be utilized as the proxy server 10, the server to provide the service 11 or the client 12.

In the information processing apparatus 100, the processor 101 deploys the program stored in the auxiliary storage unit 103 onto an operating area of the main storage unit 102 and executes the program, whereby peripheral devices are controlled. The information processing apparatus 100 is thereby enabled to attain functional means conforming to predetermined purposes. The main storage unit 102 and the auxiliary storage unit 103 are storage mediums being readable by the information processing apparatus 100.

The main storage unit 102 is exemplified as a storage unit receiving a direct access from the processor 101. The main storage unit 102 includes a Random Access Memory (RAM) and a Read Only Memory (ROM).

The auxiliary storage unit 103 stores various categories of program and various items of data in a recording medium in a readable/writable manner. The auxiliary storage unit 103 is called an external storage device. The auxiliary storage unit 103 is stored with an Operating System (OS), the various categories of programs, various types of tables, etc. The OS includes a communication interface program for transferring and receiving data to and from the external devices etc. connected via the communication unit 104. The external devices etc. include, e.g., other video processing devices and external storage devices, which are connected via the networks. Note that the auxiliary storage unit 103 may be configured as a part of, e.g., a cloud system defined as a computer group on the network.

The auxiliary storage unit 103 is, e.g., an Erasable Programmable ROM (EPROM), a Solid State Disk (SSD), a Hard Disk Drive (HDD), and so on. Further, the auxiliary storage unit 103 is, e.g., a Compact Disc (CD) Drive, a Digital Versatile Disc (DVD) Drive, a Blue-ray (registered trademark) Disc (BD) Drive, etc. Moreover, the auxiliary storage unit 103 may also be provided by a Network Attached Storage (NAS) or a Storage Area Network (SAN). The recording medium is exemplified such as a silicon disk including a nonvolatile semiconductor memory (flash memory), the hard disk, the CD, the DVD, the BD and a Universal Serial Bus (USB) memory.

The communication unit 104 is an interface with, e.g., the network environment 5. The communication unit 104 performs the communications with the external device via the network environment 5.

The information processing apparatus 100 may further include an input unit to accept, e.g., an operation instruction etc. from the user etc. This type of input unit can be exemplified by input devices such as a keyboard, a pointing device, a touch panel, an acceleration sensor and a voice/sound input device.

The information processing apparatus 100 may also be configured to include an output unit to output the data processed by, e.g., the processor 101 and the data stored in the main storage unit 102. This type of output unit can be exemplified by output devices such as a Cathode Ray Tube (CRT) Display, a Liquid Crystal Display (LCD), a Plasma Display Panel (PDP), an Electroluminescence (EL) Panel, an Organic EL Panel and a Printer.

<Function Blocks in First Embodiment>

Figure 10:
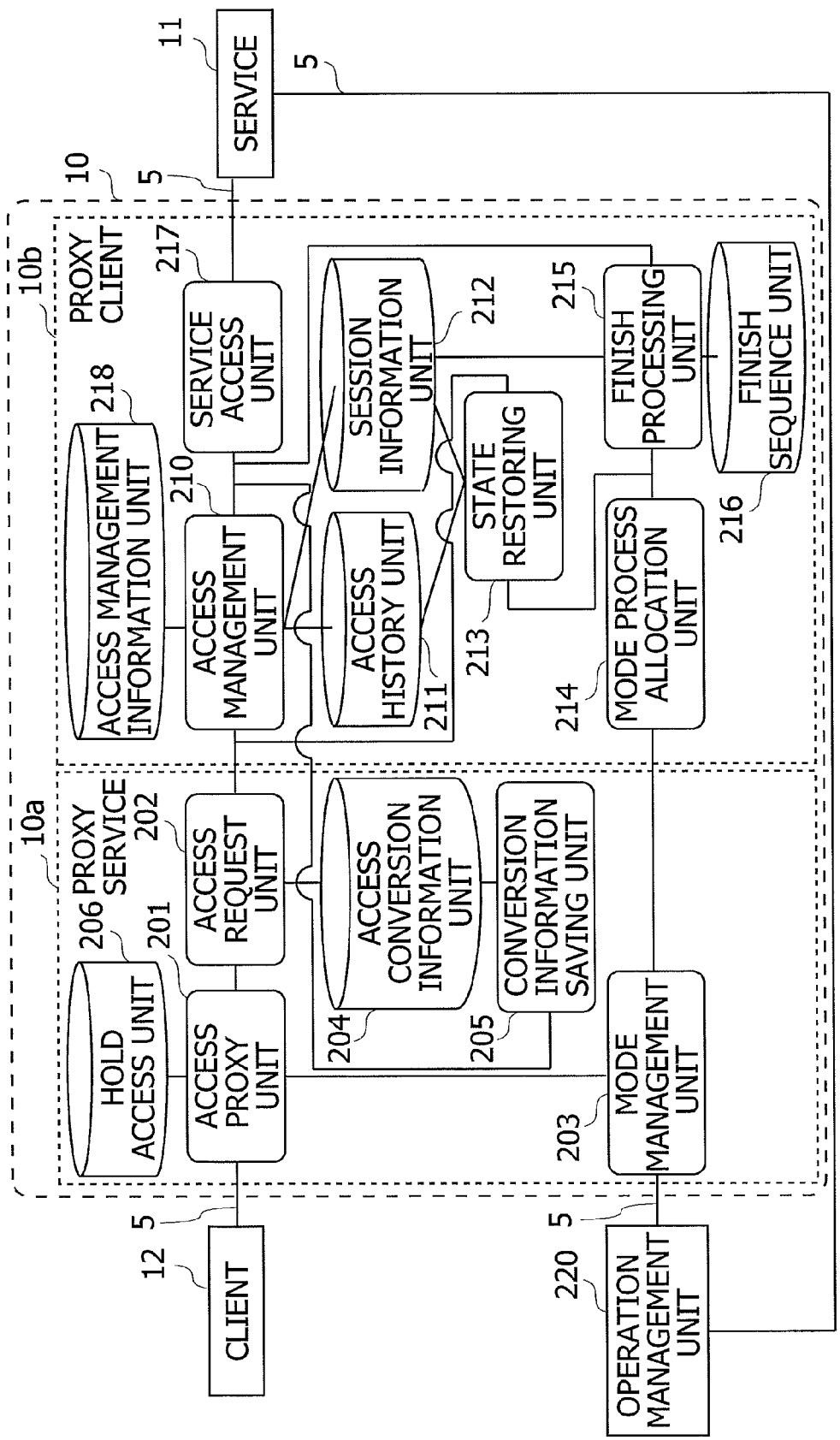
FIG. 10 is a diagram illustrating function blocks of a proxy server.

FIG. 10 is a diagram illustrating function blocks of the proxy server 10. In FIG. 10, the function blocks are exemplified by a proxy service 10a, a proxy client 10b, an operation management unit 220, the client 12 and the service 11. For example, the processor 101 in FIG. 9 executes the computer program by way of the respective blocks, the program being deployed on the main storage unit 102. However, at least a part of any one of blocks in FIG. 10 may include a hardware circuit. The proxy server 10, the server to provide the service 11, the client 12 and the operation management unit 220 are interconnected via the network environment 5. The respective function blocks of the proxy server 10 will hereinafter be described with reference to FIG. 10.

The proxy server 10 is the information processing apparatus. The proxy server 10 is installed on the communication path between the client 12 and the server to provide the service 11. The proxy server 10 includes the proxy service 10a and the proxy client 10b. The proxy server 10 conceals the interruption of the service 11 due to the update etc. from the client 12.

While the service 11 is updated, the service 11 provided to the client 12 by the service might be interrupted. Such being the case, the proxy server 10, upon receiving a notification of the service 11 being updated from the operation management unit 220, executes a process of finishing a session between the client 12 and the service 11. The session is defined as a connection relationship between the service 11 and the client 12. Session information indicating the session contains at least one argument. The argument can be said to be a parameter transferred to the service 11 from the client 12. Further, the proxy server 10 holds the data transmitted to the service 11 from the client 12 during the update of the service 11.

The proxy server 10, when notified of a start-up of the service 11 after being updated from the operation management unit 220, executes a process of restoring the STATE of the service 11. The STATE restoring process includes the initiation of the session and the restoration of the STATE of the service 11. The STATE restoration involves reproducing the data transmitted to the service 11 from the client 12. Therefore, the proxy server 10 stores a history of the communications between the client 12 and the service 11.

When restoring the STATE, the session is initiated afresh. Consequently, the session information before interrupting the service 11 is different in many cases from the session information after restarting the service 11. The session information before interrupting the service 11 is herein attached to the data being held. Hence, even when the proxy server 10 transmits the held data, the service 11 does not receive the data as the case may be.

This being the case, the proxy server 10 stores the session information of the session between the client 12 and the service 11 beforehand. The proxy server 10 refers to the stored session information, thereby converting the session information contained in the held data into the session information of the service 11 after being restarted. Thereafter, it may be sufficient that the proxy server 10 transmits the held data to the service 11.

The client 12 is not notified that the session information has been changed after restarting the service 11. Therefore, the client 12 transmits the data in a way that attaches the session information before interrupting the service 11 to the data also after restarting the service 11. The proxy server 10 converts the session information attached to the data received from the client 12 into the session information of the service 11 after being restarted. Thereafter, it may be sufficient that the proxy server 10 transmits the data received from the client 12 to the service 11.

The processes described above being thus executed, the proxy server 10 is enabled to conceal the interruption of the service 11 from the client 12.

The proxy service 10a relays the communications between the client 12 and the proxy client 10b. The proxy service 10a accepts the communications from the client 12, the operation management unit 220 and the proxy client 10b. The proxy service 10a includes an access proxy unit 201, an access request unit 202, a mode management unit 203, an access conversion information unit 204, a conversion information storing unit 205 and a hold access unit 206.

The access proxy unit 201 accepts the data transmitted from the client 12. The access proxy unit 201 switches over the processing on the basis of a mode to be set. The mode of the access proxy unit 201 includes a normal mode and an update mode. The mode of the access proxy unit 201 is changed by an instruction to change the mode, the instruction being given from the mode management unit 203. In the present specification, the mode change instruction given from the mode management unit 203 to the access proxy unit 201, will hereinafter be referred to as a mode change notification. When the mode is set to the normal mode, the access proxy unit 201 transmits the data transmitted from the client 12 to the access request unit 202. When the mode is set to the update mode, the access proxy unit 201 holds the data transmitted from the client 12. The held data is accumulated in the hold access unit 206 provided in, e.g., the main storage unit 102. The held data is transmitted to the access request unit 202 when the mode of the access proxy unit 201 is switched over to the normal mode from the update mode. The access proxy unit 201 is one example of a "transmission unit".

The access request unit 202 accepts the data from the access proxy unit 201. The session information containing at least one argument and representing the connection relationship between the service 11 and the client 12 is changed by a process of restoring the STATE after restarting the service 11 as the case may be, the process being described later on. The client 12, even when the session information is changed, transmits the data to the post-restarting service 11 by use of the session information of the pre-interrupting service 11. Then, access request unit 202 refers to the access conversion information unit 204 stored with the pre-interrupting session information and the post-restarting session information of the service 11, and thus determines whether the data accepted from the client 12 is converted or not. The access request unit 202 sets the accepted data as conversion target data when, e.g., destination URL information contained in the data received from the client 12, the argument transferred to the service 11 and the information stored in the access conversion information unit 204 are coincident. When not converting the accepted data, the access request unit 202 transmits the accepted data as it is to the proxy client 10b. Whereas when converting the accepted data, the access request unit 202 converts the data by referring to the access conversion information unit 204, and transmits the post-converting data to the proxy client 10b. The access request unit 202 is one example of a "converting unit".

The mode management unit 203 notifies the access proxy unit 201 of the mode change on the basis of the notification given from the operation management unit 220. The mode management unit 203 notifies a mode process allocation unit 214 of the notification given from the operation management unit 220. The mode management unit 203 is one example of a "management unit".

The access conversion information unit 204 is stored with Uniform Resource Locator (URL) information for specifying the conversion target data. Further, the access conversion information unit 204 is stored with the session information between the pre-interrupting service 11 and the client 12 and the session information between the post-restarting service 11 and the client 12. The access request unit 202 determines, based on the information in the access conversion information unit 204, whether the data accepted from the access proxy unit 201 is the conversion target data or not. It may be sufficient that the access conversion information unit 204 is provided in the main storage unit 102 or the auxiliary storage unit 103 in FIG. 9. Note that the information to be stored in the access conversion information unit 204 is the same as the information to be stored in a session information unit 212 of the proxy client 10b, the unit 212 being described later on. Therefore, when the access request unit 202 is enabled to use the session information unit 212 of the proxy client 10b, the access conversion information unit 204 might not be provided. The access conversion information unit 204 is one example of a "session information storage unit".

The conversion information storing unit 205 updates, based on a request of an access management unit 210 of the proxy client 10b, the information stored in the access conversion information unit 204.

The hold access unit 206 is stored with the data held by the access proxy unit 201. It may be sufficient that the hold access unit 206 is provided in the main storage unit 102 or the auxiliary storage unit 103. The hold access unit 206 is one example of a "hold unit".

The proxy client 10b relays the communications between the proxy service 10a and the service 11. The proxy client 10b includes the access management unit 210, an access history unit 211, the session information unit 212, a STATE restoring unit 213, the mode process allocation unit 214, a finish processing unit 215, a finish sequence unit 216, a service access unit 217 and an access management information unit 218.

The access management unit 210 accepts the data given from the access request unit 202 or the STATE restoring unit 213. The access management unit 210 transmits the accepted data to the service access unit 217. Further, the access management unit 210 receives a response given from the service 11 via the service access unit 217. The access management unit 210, upon accepting the data from the access request unit 202, refers to the access management information unit 218, and thus determines whether the accepted data is communication history storing target data (which will hereinafter be termed a management target in the present specification) or not. When being the management target data, the access management unit 210 stores a history of the communications between the client 12 and the service 11 in the access history unit 211. Herein, for instance, items of information such as the data received from the access request unit 202 and the response given from the service 11 are stored in the access history unit 211 per client 12. Moreover, the access management unit 210 stores the session information between the service 11 and the client 12 in the session information unit 212.

The access history unit 211 is stored with the history of the communications between the client 12 and the service 11 per client 12. The access history unit 211 may be stored with the communication histories in the way of being grouped on a session-by-session basis. It may be sufficient that the access history unit 211 is provided in the main storage unit 102 or the auxiliary storage unit 103 in FIG. 9. The access history unit 211 is one example of a "history storing unit".

The session information unit 212 is stored with the URL information, the session information between the pre-interrupting service 11 and the client 12 and the session information between the post-restarting service 11 and the client 12. It may be sufficient that the session information unit 212 is provided in the main storage unit 102 or the auxiliary storage unit 103 in FIG. 9. Note that the information stored in the session information unit 212 is the same as the information in the access conversion information unit 204 of the proxy service 10a. Therefore, when the access management unit 210, the STATE restoring unit 213 and the finish processing unit 215 are enabled to use the access conversion information unit 204 of the proxy service 10a, the session information unit 212 might not be provided. The session information unit 212 is one example of a "session information storage unit".

The STATE restoring unit 213 requests the access management unit 210 to restore the session after updating the service 11. The STATE restoring unit 213 restores the STATE by requesting the access management unit 210 to access the service 11 on the basis of the access history unit 211. Note that the communications performed by the STATE restoring unit 213 may be stored in the access history unit 211. The STATE restoring unit 213 and the access management unit 210 are given by way of one example of a "restoring unit".

The mode process allocation unit 214 receives update start and finish instructions of the service 11 from the mode management unit 203. When receiving an update start notification from the mode management unit 203, the mode process allocation unit 214 notifies the finish processing unit 215 of the start of the update. Upon completing the process by the finish processing unit 215, the mode process allocation unit 214 notifies the mode management unit 203 of the completion of the process by the finish processing unit 215. When receiving an update finishing notification from the mode management unit 203, the mode process allocation unit 214 requests the STATE restoring unit 213 to restore the STATE. Upon completing the process of restoring the STATE by the STATE restoring unit 213, the mode process allocation unit 214 notifies the mode management unit 203 of the completion of the STATE restoring process.

The finish processing unit 215 executes a process of finishing the session before the service 11 is updated. The finish processing unit 215 generates an access request to the service 11 on the basis of the session information unit 212 and the finish sequence unit 216. The service access unit 217 transmits the generated access request to the service 11. The finish processing unit 215 is one example of a "session finishing unit".

The finish sequence unit 216 is stored with a flow of the process of finishing the session with the service 11. It may be sufficient that the information stored in the finish sequence unit 216 is registered, e.g., when initial setting of the proxy server 10 is done. The service 11 is added after starting the operation of the proxy server 10, in which case it may be sufficient that the flow of the process of finishing the added service 11 is additionally registered in the finish sequence unit 216. The finish sequence unit 216 may be provided in the main storage unit 102 or the auxiliary storage unit 103 in FIG. 9. The finish sequence unit 216 is one example of a "finish procedure storage unit".

The service access unit 217 transmits, to the service 11, the data from the access management unit 210 or the finish processing unit 215. Further, the service access unit 217 receives the response from the service 11. The received response is transmitted to the access management unit 210 or the finish processing unit 215.

The access management information unit 218 stores information for specifying the management target data. The access management information unit 218 retains the URL information of the service 11 and a "method" given when accessing. The access management information unit 218 may further retain the session information. The access management information unit 218 is referred to from the access management unit 210. It may be sufficient that the information stored in the access management information unit 218 is registered, e.g., when the initial setting of the proxy server 10 is done. The service 11 is added after starting the operation of the proxy server 10, in which case it may be sufficient that the information for specifying the management target data in the added service 11 is additionally registered in the access management information unit 218. The access management information unit 218 may be provided in the main storage unit 102 or the auxiliary storage unit 103 in FIG. 9. The access management information unit 218 is one example of a "specifying unit".

The operation management unit 220 monitors the operating state of the service 11. Moreover, the operation management unit 220 implements updating the service 11. The operation management unit 220 notifies the mode management unit 203 of the start and the completion of updating the service 11. The operation management unit 220, when updating the service 11, notifies the mode management unit 203 of the start of the update. Upon receiving the notification indicating the completion of being ready for starting the update from the mode management unit 203, the operation management unit 220 starts updating the service 11. Upon the completion of updating the service 11, the operation management unit 220 notifies the mode management unit 203 of the completion of the update. The operation management unit 220 is one example of a "device to monitor an operation state of the service".

FIG. 11 is a diagram illustrating information stored in the access conversion information unit 204. For example, when the session information is changed before and after interrupting the service 11, the access request unit 202 refers to the information stored in the access conversion information unit 204 and thus converts the data given from the client 12. The information stored in the access conversion information unit 204 will hereinafter be described with reference to FIG. 11.

The access conversion information unit 204 is stored with a conversion target URL field 204a, a conversion target argument field 204b, a client field 204c, a pre-converting value field 204d and a post-converting value field 204e.

The conversion target URL field 204a is stored with a URL for specifying target data to be converted by the access request unit 202. The conversion target argument field 204b is stored with a target argument to be converted by the access request unit 202. The client field 204c is stored with information for identifying the client 12. In FIG. 11, the client field 204c is stored with an IP address (as the identifying information). However, information of the client field 204c is not limited to the IP address. The information of the client field 204c may also be, e.g., a Media Access Control (MAC) address or a host name, etc. It may be sufficient that the information in the client field 204c is information enabling the client 12 to be identified. The pre-converting value field 204d is stored with a pre-converting value being set in the conversion target argument field 204b. The pre-converting value is, e.g., a value of the argument used for the communication between the pre-updating service 11 and the client 12. The post-converting value field 204e is stored with a post-converting value being set in the conversion target argument field 204b. The post-converting value is, e.g., a value of the argument used for the communications between the post-updating service 11 and the client 12.

FIG. 12 is a diagram illustrating items of information stored in the hold access unit 206. During the interruption of the service, the access proxy unit 201 stores the data received from the client in the hold access unit 206. The hold access unit 206 is stored with information in a client field 206a, a URL field 206b, a method field 206c and a request field 206d. Items of information stored in the hold access unit 206 will hereinafter be described with reference to FIG. 12.

The client field 206a is stored with information for identifying the client 12. In FIG. 12, the client field 206a is stored with the IP address (as the identifying information). However, information of the client field 206a is not limited to the IP address. The information of the client field 206a may also be, e.g., the MAC address or the host name, etc. It may be sufficient that the information in the client field 206a is information enabling the client 12 to be identified. The URL field 206b is stored with a URL to be accessed by the client 12. The method field 206c is stored with a "method" used on the occasion of accessing the service. The "method" stored in the method field 206c is, e.g., a HTTP-based "method". The request field 206d is stored with a request transmitted to the service 11 from the client 12.

Figure 13:
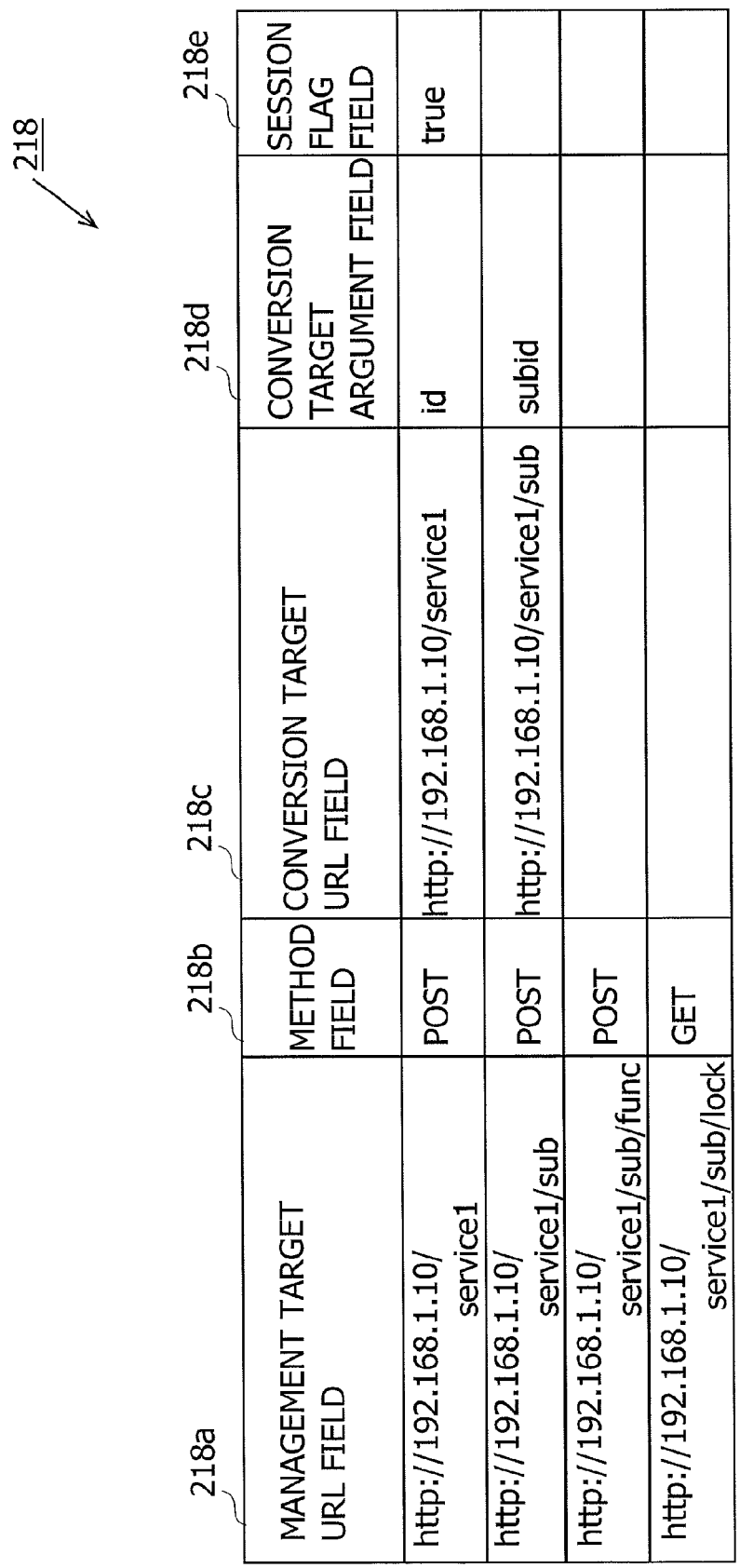
FIG. 13 is a diagram illustrating items of information stored in an access management information unit.

FIG. 13 is a diagram illustrating items of information stored in the access management information unit 218. The access management information unit 218 is stored with the information for specifying the management target data. The access management unit 210 specifies the management target data by referring to the information stored in the access management information unit 218. The access management information unit 218 is stored with values in a management target URL field 218a, a method field 218b, a conversion target URL field 218c, a conversion target argument field 218d and a session flag field 218e. The items of information stored in the access management information unit 218 will hereinafter be described with reference to FIG. 13.

The management target URL field 218a is stored with a URL of the management target service. The URL of the management target service is, e.g., a URL for specifying the communication of which a communication history is stored in the communications from the client 12 to the service 11 and the communications from the service 11 to the client 12. The method field 218b is stored with the "method" used for accessing the service 11 from the client 12.

Moreover, the access management information unit 218 is also stored with information for specifying a target to be stored in the session information storage unit 212. The target to be stored in the session information unit 212 is data containing the session information, the data being responded to the client 12 from the service 11. The conversion target URL field 218c is stored with a URL for specifying the communication becoming a target to be stored in the session information unit 212. The conversion target argument field 218d is stored with an argument becoming a target to be stored in the session information unit 212. The session flag field 218e is stored with flag information indicating whether a session group is generated or not on the occasion of recording an access history in the access history unit 211. When the flag in the session flag field 218e is set ON (set True), the history of the communication concerned is stored together with the session information in the access history unit 211.

FIGS. 14A and 14B are diagrams illustrating items of information to be stored in the access history unit 211. The access management unit 210 stores a history of the communications between the client 12 and the service 11 in the access history unit 211. The items of information stored in the access history unit 211 are used for the STATE restoring unit 213 to execute the session restoring process. The access history unit 211 is stored with the information per client 12. The access history unit 211 is stored with items of information in a session field 211a, a URL field 211b, an argument field 211c, a method field 211d, a request field 211e and a response field 211f. The items of information to be stored in the access history unit 211 will hereinafter be described with reference to FIGS. 14A and 14B.

The session field 211a is stored with the session information indicating the session. The URL field 211b is stored with the URL of the service 11. The argument field 211c is stored with a value transferred as an argument when the client 12 accesses the service 11. The method field 211d is stored with a "method" used for transmitting the data to the service 11 from the client 12. The request field 211e is stored with a request transmitted to the service 11 from the client 12. The response field 211f is stored with a response given to the client 12 from the service 11.

FIG. 15 illustrates items of information to be stored in the session information unit 212. The items of information to be stored in the session information unit 212 are used, e.g., for the finish processing unit 215 to execute a process of finishing the session between the client 12 and the service 11. Further, the items of information to be stored in the session information unit 212 are used, e.g., for the STATE restoring unit 213 to execute the process of restoring the STATE. The session information unit 212 is stored with values in a conversion target URL field 204a, a conversion target argument field 204b, a client field 204c, a pre-converting value field 204d and a post-restoring value field 212e. The items of information to be stored in the session information unit 212 are the same as the information in the access conversion information unit 204. Therefore, the explanations of the items of information to be stored in the session information unit 212 will be omitted. Note that the post-converting value field 204e in the access conversion information unit 204 is referred to as the post-restoring value field 212e in the session information unit 212.

Figure 16:
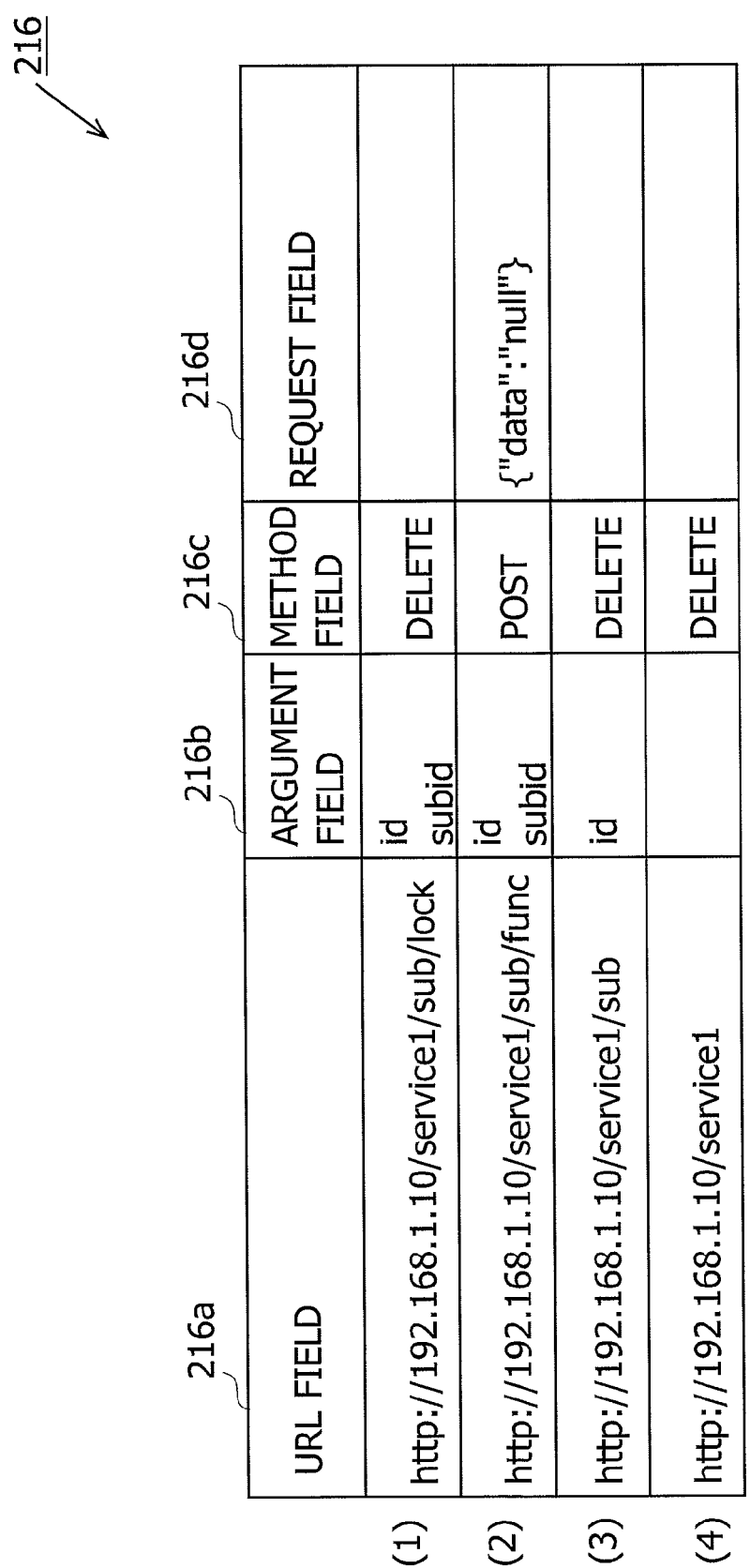
FIG. 16 is a diagram illustrating items of information stored in a finish sequence unit.

FIG. 16 is a diagram illustrating items of information to be stored in the finish sequence unit 216. The finish sequence unit 216 is stored with items of information used on the occasion of finishing the session between the client 12 and the service 11. On the occasion of finishing the session between the client 12 and the service 11, the finish processing unit 215 refers to the items of information stored in the finish sequence unit 216. The finish sequence unit 216 is stored with values in a URL field 216a, an argument field 216b, a method field 216c and a request field 216d. The items of information to be stored in the finish sequence unit 216 will hereinafter be described with reference to FIG. 16.

The URL field 216a is stored with URL information of the service 11 becoming the session finish target. The argument field 216b is stored with an argument notified together with the URL in the URL field 216a to the service 11. The method field 216c is stored with a "method" used for transmitting the data to the URL stored in the URL field 216a. The request field 216d is stored with a request transmitted to the service 11 on the occasion of finishing the session. Further in FIG. 16, the numerals (1)-(4) are attached to the left side of the table in FIG. 16 for the explanation's sake. The finish processing unit 215 processes the processes in respective records stored in the finish sequence unit 216 in the sequence of (1)-(4), thereby executing a session finishing process.

<Processing Flow of Function Block>

FIGS. 17 through 25C each illustrate a processing flow of each function block. The processing flow of each function block will hereinafter be described with reference to FIGS. 17 through 25C.

<Processing Flow of Access Proxy Unit 201>

Figure 17:
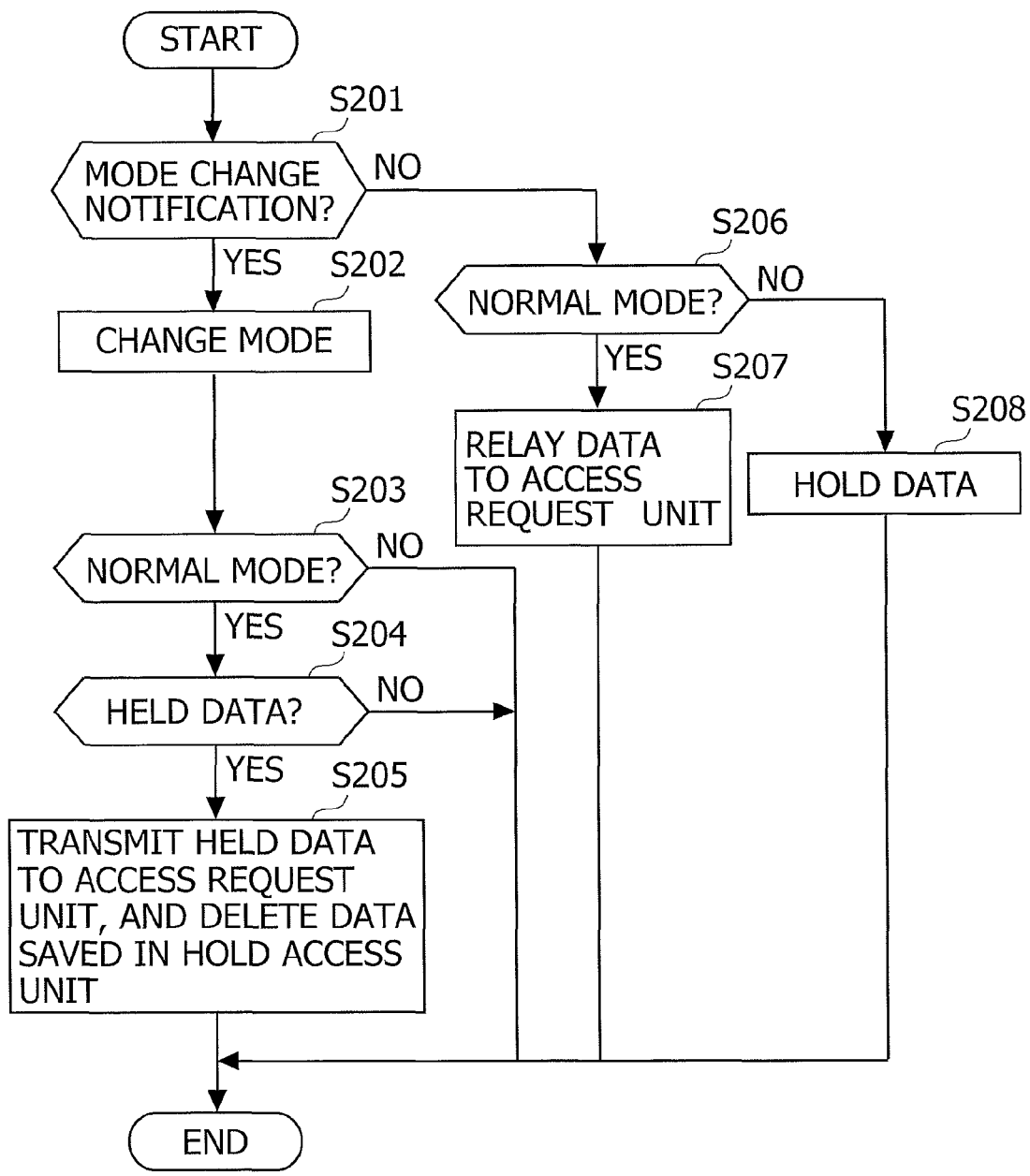
FIG. 17 is a flowchart illustrating a processing flow of a access proxy unit.

FIG. 17 is a flowchart illustrating a processing flow of the access proxy unit 201. The access proxy unit 201 receives a mode change notification from the mode management unit 203. Further, the access proxy unit 201 relays the data received from the client 12 to the access request unit 202. The process of the access proxy unit 201 will hereinafter be described with reference to FIG. 17.

The process of the access proxy unit 201 when receiving the mode change notification from the mode management unit 203 will be described by referring to S201 through S205 in FIG. 17.

The access proxy unit 201 checks whether the accepted data is the mode change notification given from the mode management unit 203 or not (S201). When the accepted data is the mode change notification, the access proxy unit 201 is changed to a designated mode (S202). The access proxy unit 201 checks whether the mode being set is a normal mode or not. When not the normal mode (NO in S203), the access proxy unit 201 finishes processing (S203). Whereas when the set mode is the normal mode (YES in S203), the access proxy unit 201 checks whether there is any data being held in the hold access unit 206 or not. When there is no held data (NO in S204), the access proxy unit 201 finishes processing (S204). Whereas when there is the held data (YES in S204), the access proxy unit 201 reads the data stored in the hold access unit 206. The access proxy unit 201 transmits the readout data to the access request unit 202. The access proxy unit 201 erases the data being transmitted to the access request unit 202 from the hold access unit 206. The process of transmitting the held data in S205 is one example of a "transmission step" (S205).

Next, the process of the access proxy unit 201 when receiving the data from the client 12 will next be described by referring to S206 through S208 in FIG. 17.

The access proxy unit 201 checks whether the set mode is the normal mode or not (S206). When the set mode is the normal mode (YES in S206), the access proxy unit 201 transmits the received data to the access request unit 202 (S207). Whereas when not the normal mode (NO in S206), the access proxy unit 201 stores the received data in the hold access unit 206. The process in S208 is one example of a "holding step" (S208).

The processes described above enable the access proxy unit 201 to transmit the data received from the client 12 to the access request unit 202. Further, the access proxy unit 201 can hold the data received from the client 12 during the interruption of the service 11. It may be sufficient that the access proxy unit 201 stores the held data in the hold access unit 206. Still further, the access proxy unit 201 can transmit the data stored in the hold access unit 206 to the service 11.

<Processing Flow of Mode Management Unit 203>

Figure 18:
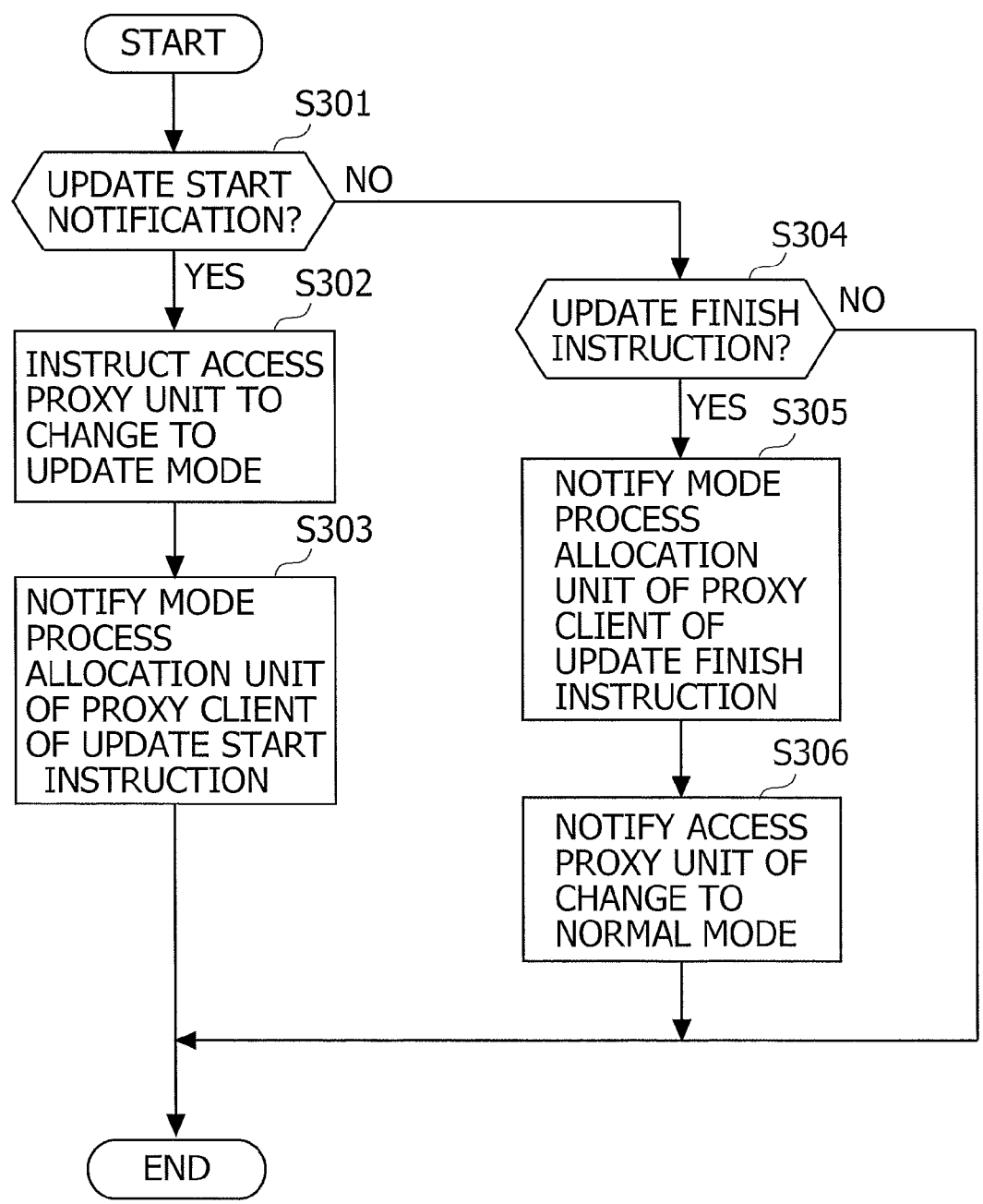
FIG. 18 is a flowchart illustrating a processing flow of a mode management unit.

FIG. 18 is a flowchart illustrating a processing flow of the mode management unit 203. The mode management unit 203, upon receiving the notification from the operation management unit 220, instructs the access proxy unit 201 to change the mode. Moreover, the mode management unit 203 notifies the mode process allocation unit 214 that the update is started and finished. The process of the mode management unit 203 will hereinafter be described with reference to FIG. 18.

To start with, the process of the mode management unit 203 when receiving the update start notification from the operation management unit 220 will be described by referring to S301 through S303 in FIG. 18.

The mode management unit 203 receives the notification from the operation management unit 220. The process in S301 is one example of a "management step" (S301). When the notification received from the operation management unit 220 is the update start notification (YES in S301), the mode management unit 203 instructs the access proxy unit 201 to change the mode to an update mode (S302). The mode management unit 203 notifies the mode process allocation unit 214 that the update is started (S303). The mode management unit 203, upon receiving a processing end from the mode process allocation unit 214, returns completion of the update start process to the operation management unit 220.

Next, the process of the mode management unit 203 when the notification given from the operation management unit 220 is other than the update start notification will be next described by referring to S304 through S306 in FIG. 18.

The mode management unit 203 determines whether the notification given from the operation management unit 220 is the update finish notification or not. The process in S304 is one example of a "management step" (S304). When the notification given from the operation management unit 220 is the update finish notification (YES in S304), the mode management unit 203 notifies the mode process allocation unit 214 that the update is finished (S305). The mode management unit 203, upon receiving a processing end from the mode process allocation unit 214, instructs the access proxy unit 201 to change the mode to the normal mode (S306). Whereas when the notification given from the operation management unit 220 is not the update finish notification (NO in S304), the mode management unit 203 finishes processing.

The processes described above enable the mode management unit 203 to instruct the access proxy unit 201 and the mode process allocation unit 214 to execute processing on the basis of the notification given from the operation management unit 220.

<Processing Flow of Access Request Unit 202>

Figure 19:
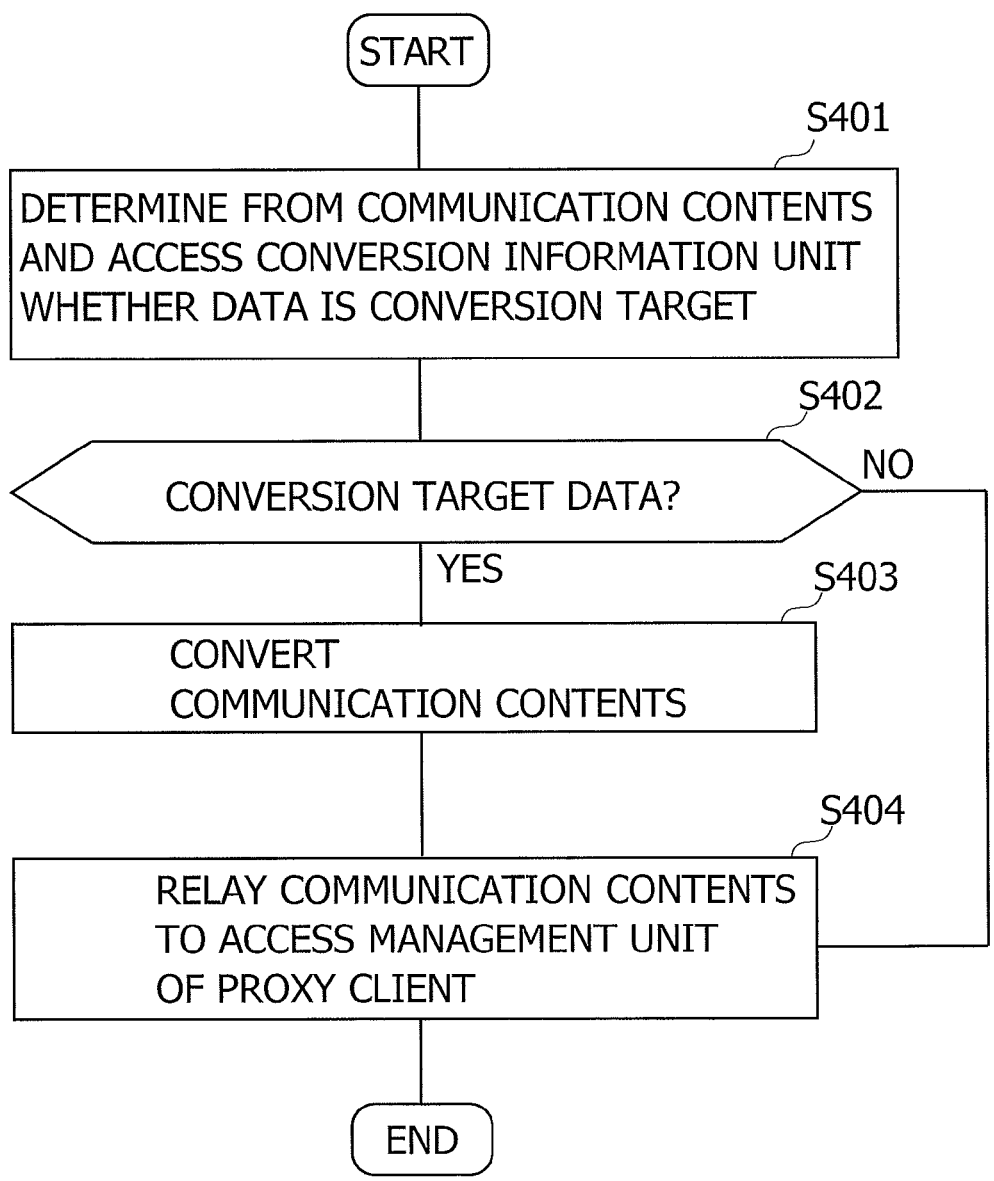
FIG. 19 is a flowchart illustrating a processing flow of an access request unit.

FIG. 19 is a flowchart illustrating a processing flow of the access request unit 202. The access request unit 202 relays the data from the access proxy unit 201 to the access management unit 210. The access request unit 202, when the data coming from the access proxy unit 201 is conversion target data, converts the data and relays the converted data to the access management unit 210. The process of the access request unit 202 will hereinafter be described with reference to FIG. 19.

The access request unit 202 receives the data from the access proxy unit 201. The access request unit 202 refers to the access conversion information unit 204, thereby determining whether the received data is the conversion target data or not. This determination is made based on whether or not, e.g., a destination URL, an argument and a sender IP address of the received data are coincident with the items of information stored in the conversion target URL field 204a, the conversion target argument field 204b and the client field 204c of the access conversion information unit 204 (S401). When the received data is the conversion target data (YES in S402), the access request unit 202 converts the data on the basis of the items of information stored in the access conversion information unit 204. The process in S403 is one example of a "conversion step" (S403).

For example, the process in S403 is, when the items of information illustrated in FIG. 11 are stored in the access conversion information unit 204, exemplified as follows. The data specified by "http://192.168.1.10/service1?id=1240" is transmitted from the client specified by the IP address "192.168.1.22". The transmitted data is received by the access request unit 202 via the access proxy unit 201. The access request unit 202 compares the received data with the items of information in the access conversion information unit 204. The access request unit 202 determines that the URL, the argument and the client of the received data are coincident with the items of information stored in the access conversion information unit 204. As a result, the access request unit 202 converts the data into "http://192.168.1.10/service1?id=1251". Further, another case is considered, in which a communication specified by "http://192.168.1.10/service1/sub?id=1240&subid=1" is given from the client specified by the IP address "192.168.1.22". In this case, the access request unit 202 refers to the access conversion information unit 204, and thus converts the received data into "http://192.168.1.10/service1/sub?id=1251&subid=2". Still another case is considered, in which data specified by "http://192.168.1.10/service1/sub?id=1234&subid=1" is transmitted from the client specified by, e.g., the IP address "192.168.1.20". In this case, when referring to the access conversion information unit 204, values "id" and "subid" as the conversion target arguments remain unchanged before and after the conversion. Therefore, the access request unit 202 might not convert this data.

In the foregoing example with reference to FIG. 11, when the URL information stored in the conversion target URL field 204a is contained in a destination URL of the data transmitted from the client 12, this data is set as the conversion target data. The process by the access request unit 202 is not, however, limited to the configuration such as this. The access request unit 202, when the URL information stored in the conversion target URL field 204a is coincident with the destination URL of the data transmitted from the client 12, may set this data as the conversion target data.

In the foregoing example with reference to FIG. 11, the argument in the conversion target argument field 204b is an HTTP-based argument. However, the argument in the conversion target argument field 204b is not limited to the HTTP-based argument. The argument in the conversion target argument field 204b may be contained as, e.g., a part of the URL information. An example of containing the argument as a part of the URL information can be exemplified such as "http:/http://192.168.1.10/service1/1234/1". In the case of this example, the URL information contains "1234" and "1" as the values of the arguments. In the case of this instance, it may be sufficient that the access conversion information unit 204 is stored with information for specifying a position of the argument in the URL information.

Referring back to FIG. 19, the description of the processing flow of the access request unit 202 is continued. When the received data is not the conversion target data, the access request unit 202 does not convert the received data (NO in S402). The access request unit 202 relays the data to the access management unit 210 (S404).

The processes described above enable the access request unit 202 to transmit the data received from the access proxy unit 201 to the access management unit 210. Furthermore, the access request unit 202 refers to the access conversion information unit 204 and is thereby enabled to convert the data received from the access proxy unit 201. As a result, even when the session information is different before and after the interruption of the service 11, the service 11 can receive the data transmitted from the client 12.

<Processing Flow of Conversion Information Storing Unit 205>

Figure 20:
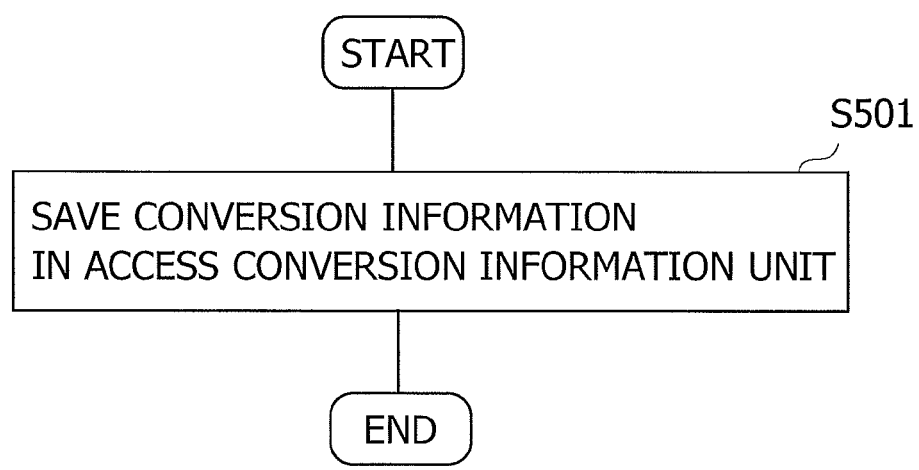
FIG. 20 is a flowchart illustrating a processing flow of a conversion information storing unit.

FIG. 20 is a flowchart illustrating a processing flow of the conversion information storing unit 205. The conversion information storing unit 205 stores the data converted in response to the instruction given from the access management unit 210. A processing flow of the conversion information storing unit 205 will hereinafter be described with reference to FIG. 20.

The conversion information storing unit 205 receives the values in the conversion target URL field 204a, the conversion target argument field 204b, the client IP address field 204c, the pre-converting value field 204d and the post-converting value field 204e from the access management unit 210. With respect to the received values, when the access conversion information unit 204 has already been stored with the items of information with which the values in the conversion target URL field 204a, the conversion target argument field 204b, the client IP address field 204c and the pre-converting value field 204d are coincident, the conversion information storing unit 205 updates the value in the post-converting value field 204e. With respect to the received value, when the access conversion information unit 204 has not been stored with the items of information with which the values in the conversion target URL field 204a, the conversion target argument field 204b, the client IP address field 204c and the pre-converting value field 204d are coincident, the conversion information storing unit 205 stores the values received from the access management unit 210 as new values in the access conversion information unit 204 (S501).

The processes described above enable the conversion information storing unit 205 to update the information to be stored in the access conversion information unit 204 on the basis of the request given from the access management unit 210.

<Processing Flow of Access Management Unit 210>

Figure 21:
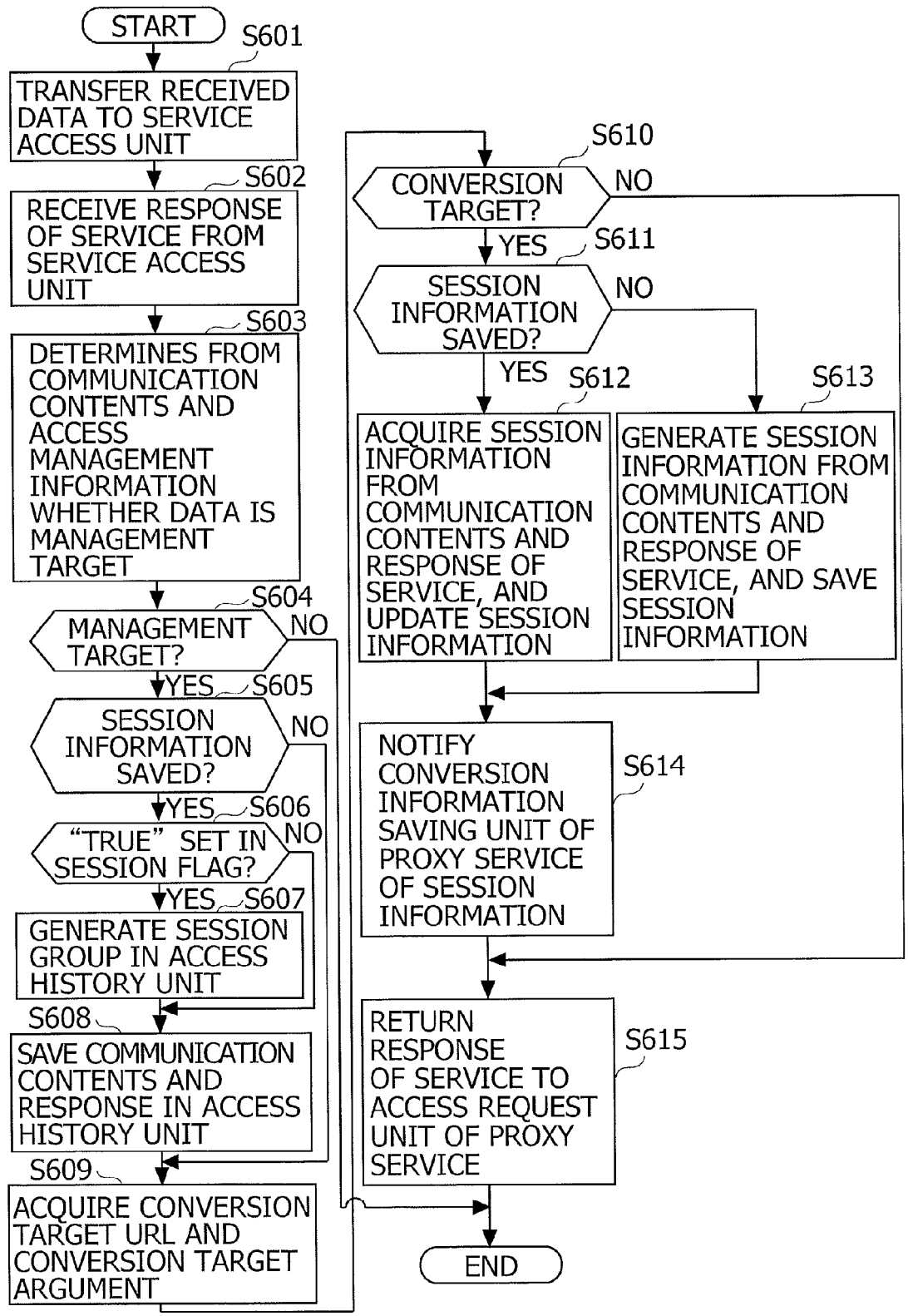
FIG. 21 is a flowchart illustrating a processing flow of an access management unit.

FIG. 21 is a flowchart illustrating a processing flow of the access management unit 210. The access management unit 210 relays the data from the access request unit 202 to the service access unit 217. A processing flow of the access management unit 210 will hereinafter be described with reference to FIG. 21.

The access management unit 210 receives the data from the access request unit 202. The access management unit 210 transmits the received data to the service access unit 217 (S601). The access management unit 210 receives a response from the service 11 via the service access unit 217 (S602). The access management unit 210 checks whether the data received from the access request unit 202 is the management target data or not. It may be sufficient that the access management unit 210 checks whether or not, e.g., the destination URL and the "method" of the data received from the access request unit 202 are coincident with the URL and the "method", which are stored in the management target URL field 218a and the method field 218b of the access management information unit 218. When coincident with each other, the access management unit 210 determines the data received from the access request unit 202 to be the management target data. The process in S603 is one example of a "specifying step" (S603). When not the management target data (NO in S604), the access management unit 210 finishes processing. Whereas when the received data is the management target data (YES in S604), the access management unit 210 checks whether the session information of this data is stored in the session information unit 212 or not (S605). When the session information is not stored therein (NO in S605), the access management unit 210 advances the processing to S609. Whereas when the session information is stored therein (YES in S605), the access management unit 210 refers to the access management information unit 218, thereby checking whether or not the flag is set ON (true) in the session flag field 218e (S606). When the flag is not set ON (true) in the session flag field 218e (NO in S606), the access management unit 210 advances the processing to S608. Whereas when the flag is set ON (true) in the session flag field 218e (YES in S606), the access management unit 210 generates a group for the session (which will hereinafter be referred to a "session group" in the present specification). It may be sufficient that the session group is generates in the way of setting, as a key, the value stored in the conversion target argument field 218d associated with "ON (true)" being set in the session flag field 218e (S607). The access management unit 210 stores, in the access history unit 211, the data received from the access request unit 202 and a response, received from the service access unit 217, of the service 11. The processes in S607-S608 are given by way of one example of a "history storing step" (S608).

For example, the process in S608 is exemplified based on, e.g., the following specific example. Such a case is considered that a request "{"name":"user1","pass":"xxx"}" is transmitted based on a POST method to the URL "http://192.168.1.10/service1" from the client 12 specified by the IP address "192.168.1.20", and a response "{"id":"1234"}" is given from the service 11. Further, it is assumed that the values exemplified in FIG. 13 are stored in the access management information unit 218. In this case, the items of data transmitted from the client 12 are coincident with the values in the management target URL field 218a and the method field 218b of the access management information unit 218 illustrated in FIG. 13. Hence, the access management unit 210 determines that the data of this communication is the management target data. Moreover, the value "id" in the conversion target argument field is associated with "true" being set in the session flag field. Therefore, the access management unit 210 generates a session group with "id" being set to "1234" (id=1234) in the access history unit 211. With respect to the thus-generated group, the access management unit 210 stores "http://192.168.1.10/service1" in a URL field 211b, "null" in an argument field 211c, "POST" in a method field 211d, "{"name":"user1","pass":"xxx"}" in a request field 211e, and "{"id":"1234"}" in a response field 211f. As a result, the access history unit 211 becomes as indicated by a first row (first record) (a value "id=1234" is set in the session field 211a) in FIG. 14A.

Referring back to FIG. 21, the description of the processing flow of the access management unit 210 is continued. The access management unit 210 acquires the values in the conversion target URL field 218c and the conversion target argument field 218d, which are stored in the access management information unit 218 (S609). The access management unit 210 checks whether or not the conversion target URL field 218c and the conversion target argument field 218d contain the URLs and the arguments, some of which are coincident with the destination URL and the argument of the data received from the access request unit 202. When there are the values (URL and argument) coincident therewith, the access management unit 210 determines that this data is the conversion target data. Whereas when not coincident, the access management unit 210 determines that this data is not the conversion target data (S610). When not the conversion target data (NO in S610), the access management unit 210 advances the processing to S615. Whereas when being the conversion target data (YES in S610), the access management unit 210 checks whether or not the items of information of the data concerned are stored in the session information unit 212 (S611). When stored in the session information unit 212 (YES in S611), the access management unit 210 acquires the session information from contents of the data and the response of the service 11. The session information is, e.g., a value of the argument associated with "true" being set in the session flag field 218e of the access management information unit 218. As described above, the items of information stored in the access management information unit 218 are registered when conducting the initial setting of the proxy server 10. The access management unit 210 stores the acquired session information in the post-restoring value field 212e of the session information unit 212. The stored session information is used for the finishing process by the finish processing unit 215 or the STATE restoring process by the STATE restoring unit 213. The process in S612 is one example of a "session information storing step" (S612). When the session information is not stored (NO in S611), the access management unit 210 generates the session information on the basis of the data given from the client 12 and the response given from the service 11, and stores the generated session information in the session information unit 212. The session information contains, e.g., the destination URL of the data from the client 12, the IP address of the client 12, the argument and the value set in the argument field. The process in S613 is one example of a "session information storing step" (S613). The access management unit 210 notifies the conversion information storing unit 205, of the proxy service 10a, of the session information. The conversion information storing unit 205 updates, based on the notified information, the access conversion information unit 204 (S614). The access management unit 210 transmits the response received from the service 11 to the access request unit 202 (S615).

The processes described above enable the access management unit 210 to transmit the data received from the access request unit 202 to the service access unit 217. Further, the access management unit 210 can store the management target data in the access history unit 211. Moreover, the access management unit 210 can store the session information of the conversion target data in the session information unit 212. Herein, the access from the access request unit 202 is described, however, the access management unit 210 also handles the access from the STATE restoring unit 213. On this occasion, there is a difference that the access is not stored in the access history unit 211, however, the processes described above are executed for others.

<Processing Flow of Service Access Unit 217>

Figure 22:
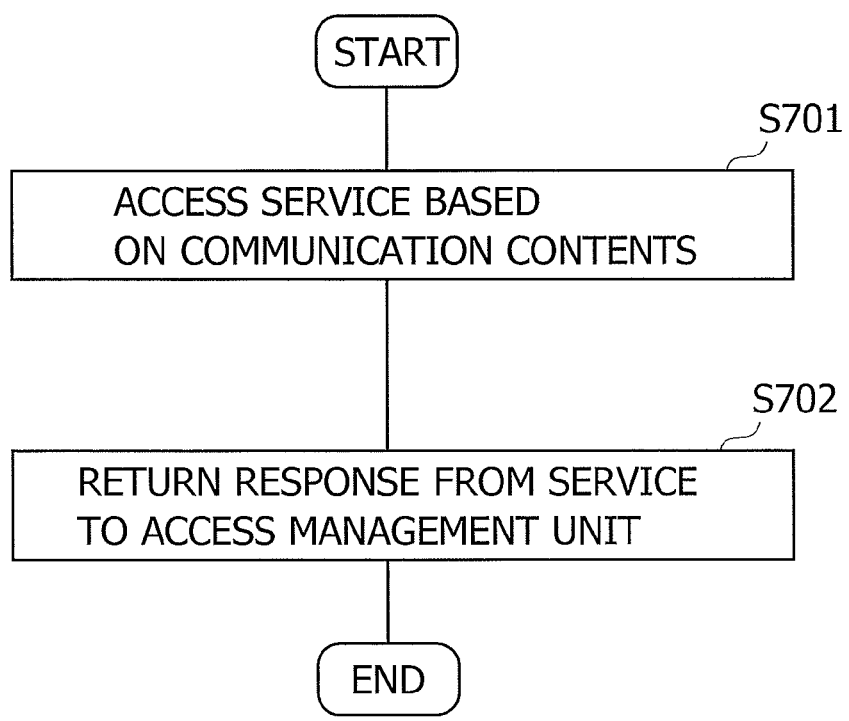
FIG. 22 is a flowchart illustrating a processing flow of a service access unit.

FIG. 22 is a flowchart illustrating a processing flow of the service access unit 217. The service access unit 217 transmits the data received from the access management unit 210 to the service 11. The service access unit 217 transmits the response received from the service 11 to the access management unit 210. The processing flow of the service access unit 217 will hereinafter be described with reference to FIG. 22.

The service access unit 217 transmits the data received from the service access unit 217 to the service 11 (S701). The service access unit 217 receives the response from the service 11. The service access unit 217 transmits the received response to the access management unit 210 (S702).

The processes described above enable the service access unit 217 to transmit the data received from the access management unit 210 to the service 11. Further, the service access unit 217 can transmit, to the access management unit 210, the data of the response to the client 12 from the service 11. The service access unit 217 has also a role of relaying the data received from the finish processing unit 215 to the service 11. The access management unit 210 being replaced in terms of reading by the finish processing unit 215, the process described above turns out to be such a process that the access to the service 11 from the finish processing unit 215 is relayed by the service access unit 217.

<Processing Flow of Mode Process Allocation Unit 214>

Figure 23:
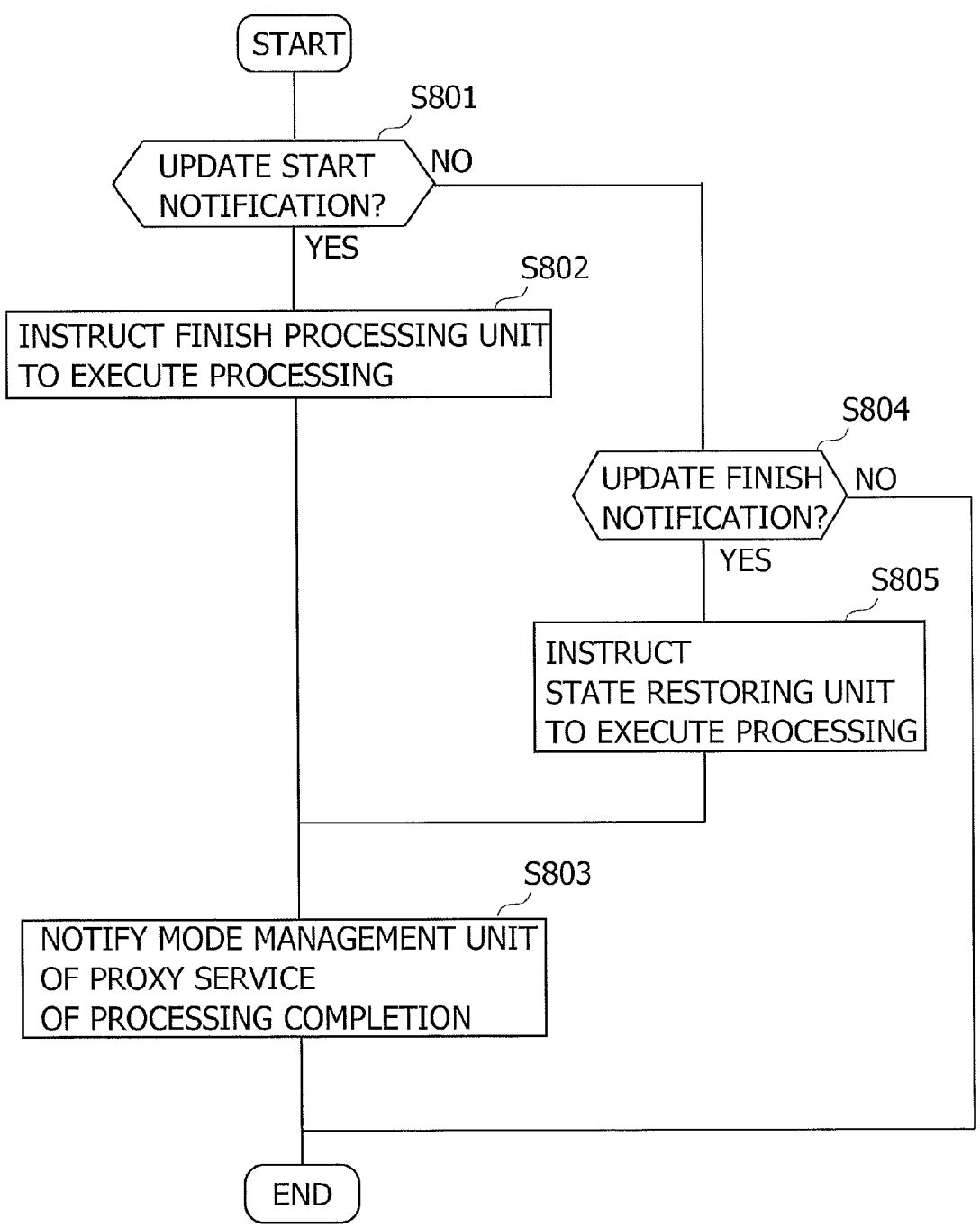
FIG. 23 is a flowchart illustrating a processing flow of a mode process allocation unit.

FIG. 23 is a flowchart illustrating a processing flow of the mode process allocation unit 214. The mode process allocation unit 214 receives an update start or end notification from the mode management unit 203. The processing flow of the mode process allocation unit 214 will hereinafter be described with reference to FIG. 23.

When receiving the update start notification from the mode management unit 203, the processes of the mode process allocation unit 214 will be explained by referring to S801 through S803 in FIG. 23.

The mode process allocation unit 214 determines whether the notification received from the mode management unit 203 is the update start notification or not (S801). When the notification is the update start notification (YES in S801), the mode process allocation unit 214 instructs the finish processing unit 215 to execute the finishing process (S802). The mode process allocation unit 214 receives a report of completing the finishing process from the finish processing unit 215. The mode process allocation unit 214 notifies the mode management unit 203 of the completion of the process (S803).

Next, the process of the mode process allocation unit 214 when the notification received from the mode management unit 203 is not the update start notification, will be described by referring to steps from S804 onward in FIG. 23.

The mode process allocation unit 214 determines whether the notification received from the mode management unit 203 is the update finish notification or not (S804). When the notification is the update finish notification (YES in S804), the mode process allocation unit 214 instructs the STATE restoring unit 213 to execute the process (S805). The mode process allocation unit 214 receives a report of completing the STATE restoring process from the STATE restoring unit 213. The mode process allocation unit 214 notifies the mode management unit 203 of the completion of the process (S803). Whereas when not the update finish notification, the mode process allocation unit 214 finishes processing (NO in S804).

The processes described above enable the mode process allocation unit 214 to instruct the finish processing unit 215 or the STATE restoring unit 213 to execute the process in accordance with the notification given from the mode management unit 203.

<Processing Flow of Finish Processing Unit 215>

Figure 24A:
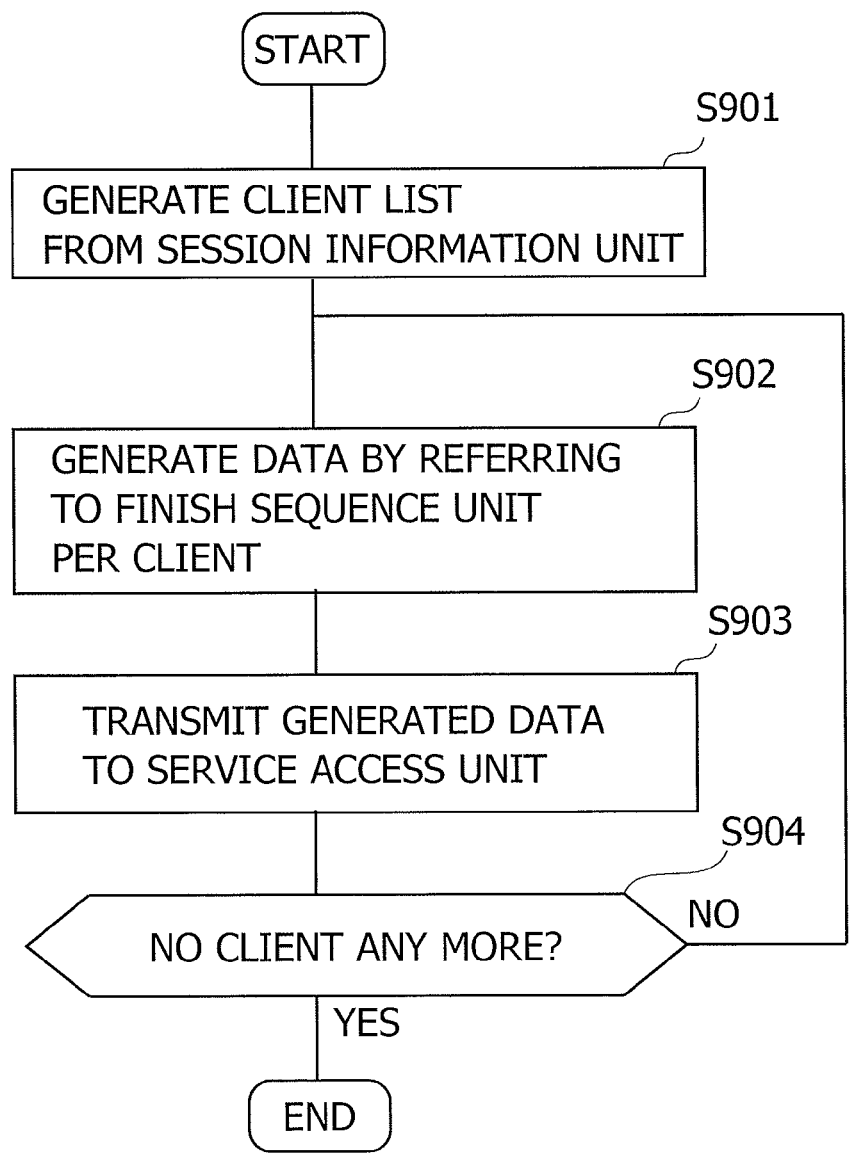
FIG. 24A is a flowchart illustrating a processing flow of a finish processing unit.

FIG. 24A is a flowchart illustrating a processing flow of the finish processing unit 215. The finish processing unit 215 executes the process of finishing the session with the service 11 via the service access unit 217. The processing flow of the finish processing unit 215 will hereinafter be described with reference to FIG. 24A.

The finish processing unit 215 refers to the session information unit 212 and thus generates a list of the clients 12 establishing the sessions with the service 11 (S901). The finish processing unit 215 generates data for finishing the session with the service 11 by referring to the finish sequence unit 216 and the session information unit 212 per client 12 being listed (S902). The finish processing unit 215 transmits the generated data to the service 11 via the service access unit 217. The process in S903 is one example of a "session finishing step" (S903). The finish processing unit 215 checks whether or not the processes in S902 through S903 are completed for all of the clients being listed in S901. When not completed, the finish processing unit 215 repeats the processes from S902 onward (NO in S904). Whereas when completed, the finish processing unit 215 finishes processing (YES in S904).

FIGS. 24B1 and 24B2 are diagrams illustrating contents of the data to be generated by the finish processing unit 215. The data to be generated by the finish processing unit 215 are generated per client 12. FIGS. 24B1 and 24B2 illustrate the contents of the data used for the finishing processes of the two clients (specified by an IP address "192.168.1.20" and an IP address "192.168.1.22"). FIGS. 24B1 and 24B2 also depict a URL field 215a, an argument field 215b, a method field 215c and a request field 215d. The session finishing process executed by the finish processing unit 215 will hereinafter be described with reference to FIGS. 24B1 and 24B2.

A value (an item of information) in the URL field 215a is exemplified by the URL information of the service 11 serving as a session finishing process target. Values in the argument field 215b are exemplified by arguments and values of the arguments, which are transferred to the service 11 on such an occasion that the finish processing unit 215 accesses the URL given in the URL field 215a. A value in the method field 215c is exemplified by a "method" used on the occasion that the finish processing unit 215 accesses the URL given in the URL field 215a. A value in the request field 215d is exemplified by a request transmitted on the occasion that the finish processing unit 215 accesses the URL given in the URL field 215a. FIGS. 24B1 and 24B2 illustrate one set of data in one horizontal row. The finish processing unit 215 transmits the data having the contents illustrated in the respective rows in FIGS. 24B1 and 24B2, thereby executing the session finishing process.

The process, by which the finish processing unit 215 finishes the session established between the client specified by the IP address "192.168.1.20" and the service specified by the URL "http://192.168.1.10/service1", will be described with reference to FIG. 24B1. To begin with, the finish processing unit 215 transmits data containing "http://192.168.1.10/service1/sub/lock" designated as the URL, "id=1234" and "subid=1" designated as the arguments and "DELETE" designated as the "method". Subsequently, the finish processing unit 215 transmits data containing "http://192.168.1.10/service1/sub/func" designated as the URL, "id=1234" and "subid=1" designated as the arguments, "POST" designated as the "method" and "{"data":"null"}" designated as the request. Still subsequently, the finish processing unit 215 transmits data containing "http://192.168.1.10/service1/sub" designated as the URL, "id=1234" and "subid=1" designated as the arguments and "DELETE" designated as the "method". Finally, the finish processing unit 215 transmits data containing "http://192.168.1.10/service1" designated as the URL, "id=1234" designated as the argument and "DELETE" designated as the "method". Through the processes described above, the finish processing unit 215 finishes the session established between the client specified by the IP address "192.168.1.20" and the service specified by the URL "http://192.168.1.10/service1".

The processes described above enable the finish processing unit 215 to normally finish the session before interrupting the service 11.

<Processing Flow of STATE Restoring Unit 213>

Figure 25A:
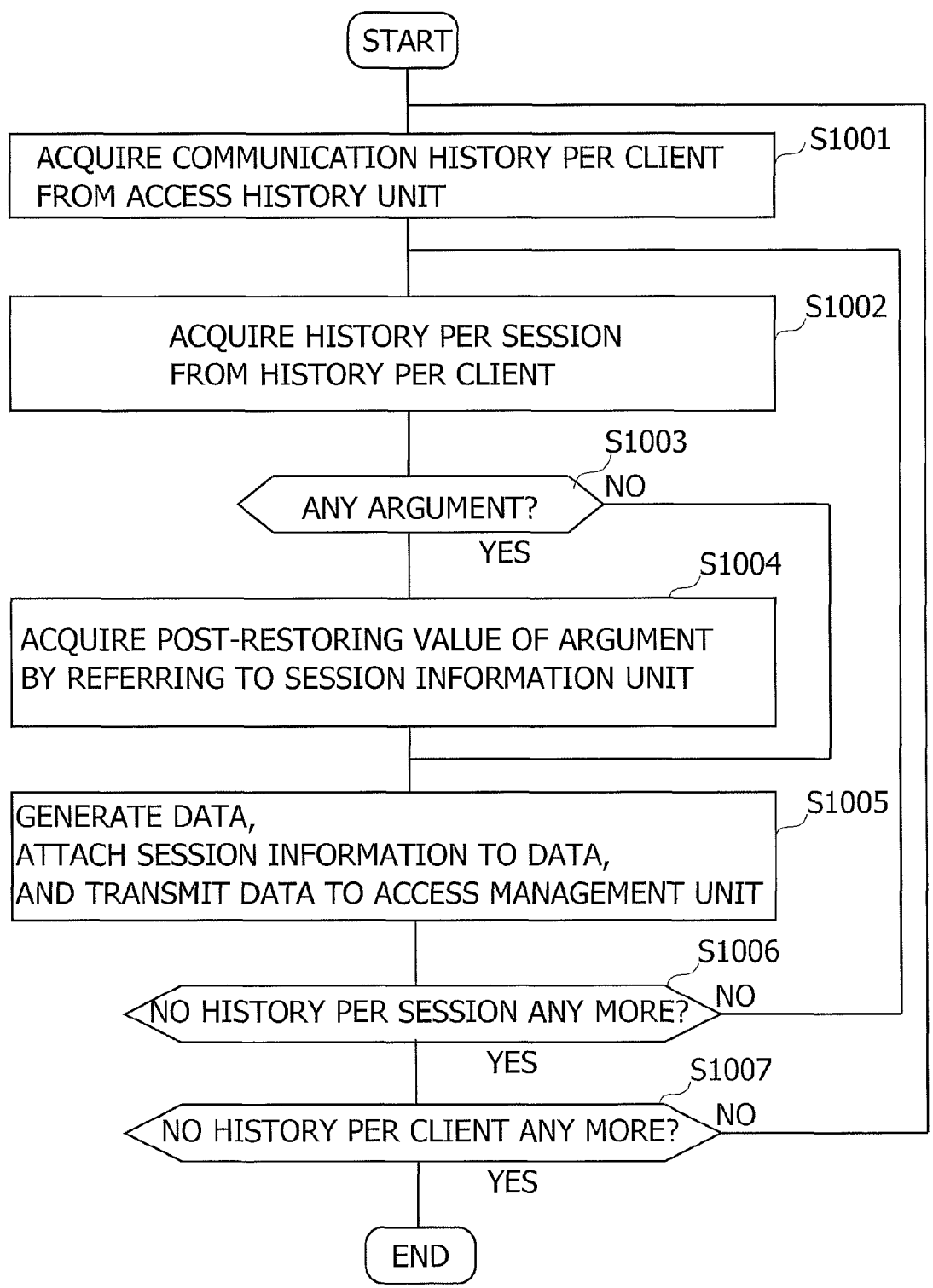
FIG. 25A is a flowchart illustrating a processing flow of a STATE restoring unit.

FIG. 25A is a flowchart illustrating a processing flow of the STATE restoring unit 213. The STATE restoring unit 213 executes the process of restoring the STATE after updating the service 11. The STATE restoring unit 213 performs the STATE restoring process by referring to the access history unit 211 and the session information unit 212. The process of the STATE restoring unit 213 will hereinafter be described with reference to FIG. 25A.

The STATE restoring unit 213 acquires a communication history per client 12 from the access history unit 211 (S1001). The STATE restoring unit 213 acquires a communication history on a session-by-session basis from the communication history per client 12 (S1002). The STATE restoring unit 213 checks whether or not an argument is contained in the communication history acquired on the session-by-session basis. When the argument is not contained (NO in S1003), the STATE restoring unit 213 advances the processing to S1005 (S1003). Whereas when the argument is contained (YES in S1003), the STATE restoring unit 213 acquires the value stored in the post-restoring value field 212e of the session information unit 212 (S1004). The STATE restoring unit 213 generates data used for restoring the STATE on the basis of the items of information acquired in S1001 through S1004. The STATE restoring unit 213 attaches, to the generated data, the value in the post-restoring value field 212e as the session information from the session information unit 212. The STATE restoring unit 213 requests the access management unit 210 to transmit the data attached with the session information to the service 11. The access management unit 210 transmits the requested data to the service 11 via the service access unit 217. The process in S1005 is one example of a "restoring step" (S1005). The STATE restoring unit 213 checks whether all of the histories on the session-by-session basis are processed or not. When there is any unprocessed history on the session-by-session basis (NO in S1006), the STATE restoring unit 213 loops back the processing to S1002 (S1006). Whereas when all of the histories on the session-by-session basis are processed (YES in S1006), the STATE restoring unit 213 refers to the access history unit 211, thus checking whether all of the histories per client are processed or not. When there is the unprocessed history per client, the STATE restoring unit 213 loops back the processing to S1001. Whereas when all of the histories per client are processed, the STATE restoring unit 213 finishes processing (S1007).

FIGS. 25B1 and 25B2 are diagrams illustrating contents of the data generated by the STATE restoring unit 213 and also contents of response data from the service 11 with respect to the generated data. FIGS. 25B1 and 25B2 illustrate the contents of the data generated by the STATE restoring unit 213 and the contents of the response data given from the service 11 with respect to the generated data when there is the access history depicted in FIGS. 14A and 14B. The data of the STATE restoring unit 213 is generated per client 12. FIGS. 25B1 and 25B2 depict the contents of the data used for restoring the STATEs of the two clients (specified by the IP address "192.168.1.20" and the IP address "192.168.1.22") FIGS. 25B1 and 25B2 illustrate values in a URL field 213a, an argument field 213b, a method field 213c, a request field 213d and a response field 213e. The process to be executed by the STATE restoring unit 213 will hereinafter be described with reference to FIGS. 25B1 and 25B2.

The value in the URL field 213a represents the URL information of the service 11 becoming the STATE restoring target. The values in the argument field 213b represent an argument and a value of the argument, which are transferred to the service 11, on the occasion that the STATE restoring unit 213 accesses the service 11 provided (specified) by the URL stored in the URL field 213a. The value in the method field 213c represents a "method" used on the occasion that the STATE restoring unit 213 accesses the service 11 provided by the URL stored in the URL field 213a. The value in the request field 213d represents a request transmitted on the occasion that the STATE restoring unit 213 accesses the service 11 provided by the URL stored in the URL field 213a. The value in the response field 213e represents a response received by the STATE restoring unit 213 from the service 11. The response given in the response field 213e from the service 11 is stored by the access management unit 210 in the post-restoring value field 212e of the session information unit 212. FIGS. 25B1 and 25B2 illustrate one set of data containing the values in the URL field 213a, the argument field 213b, the method field 213c and the request field 213d in one horizontal row. The STATE restoring unit 213 generates data having the contents given in the respective rows in FIGS. 25B1 and 25B2. The STATE restoring unit 213 requests the access management unit 210 to transmit the generated data, thereby executing the STATE restoring process.

Exemplified is a process for describing, with reference to FIG. 25B1, such a process that the STATE restoring unit 213 restores the STATE between the client specified by the IP address "192.168.1.20" and the service specified by the URL "http://192.168.1.10/service1". At first, a first example in the second row of FIG. 25B1 will be explained. In this example, the STATE restoring unit 213 generates data containing a URL "http://192.168.1.10/service1", a method "POST" and a request "{"name":"user1","pass":"xxx"}". The STATE restoring unit 213 requests the access management unit 210 to transmit the generated data. The access management unit 210 transmits the requested data via the service access unit 217. The access management unit 210 receives a response "{"id":"1252"}" as a response to the transmitted data. The access management unit 210 stores the value "1252" of the response "{"id":"1252"}" in the post-restoring value field 212e of the session information unit 212. Further, the access management unit 210 requests the conversion information storing unit 205 to store the value "1252" of the response "{"id":"1252"}" in the post-converting value field 204e of the access conversion information unit 204. The conversion information storing unit 205 stores the value "1252" of the response "{"id":"1252"}" in the post-converting value field 204e of the access conversion information unit 204.

Next, a second example given in the third row in FIG. 25B1 will be explained. In this example, the STATE restoring unit 213 generates data containing a URL "http://192.168.1.10/service1/sub", an argument "id=1252", a method "POST" and a request "{"device":"device1"}". The STATE restoring unit 213 requests the access management unit 210 to transmit the generated data. The access management unit 210 transmits the requested data. The access management unit 210 receives a response "{"subid":"2"}" as a response to the transmitted data via the service access unit 217. The access management unit 210 stores the value "2" of the response "{"subid":"2"}" in the post-restoring value field 212e of the session information unit 212. Moreover, the access management unit 210 requests the conversion information storing unit 205 to store the value "2" of the response "{"subid":"2"}" in the post-converting value field 204e of the access conversion information unit 204. The conversion information storing unit 205 stores the value "2" of the response "{"subid":"2"}" in the post-converting value field 204e of the access conversion information unit 204.

Subsequently, a third example given in the fourth row in FIG. 25B1 will be explained. In this example, the STATE restoring unit 213 generates data containing a URL "http://192.168.1.10/service1/func", arguments "id=1252" and "subid=2", a method "POST" and a request "{"data":"test"}". The STATE restoring unit 213 requests the access management unit 210 to transmit the generated data. The access management unit 210 transmits the requested data. The access management unit 210 receives a response "{"result":"success"}" as a response to the transmitted data via the service access unit 217.

Still subsequently, a fourth example given in the fifth row in FIG. 25B1 will be explained. In this example, the STATE restoring unit 213 generates data containing a URL "http://192.168.1.10/service1/lock", arguments "id=1252" and "subid=2" and a method "GET". The STATE restoring unit 213 requests the access management unit 210 to transmit the generated data. The access management unit 210 transmits the requested data. The access management unit 210 receives a response "{"result":"success"}" as a response to the transmitted data via the service access unit 217. Through the processes described above, the STATE restoring unit 213 restores the STATE back to a pre-updating state.

FIG. 25C is a diagram illustrating the access conversion information unit 204 after restoring the STATE. FIG. 25C depicts the access conversion information unit 204 when the STATE restoring process illustrated in FIGS. 25B1 and 25B2 is carried out. In FIG. 25C, a value in the response field 213e, the value being acquired in the restoring process by the STATE restoring unit 213, is stored in the post-restoring value field 212e. The client 12 transmits data to the service 11 by using the pre-updating session information (corresponding to the pre-converting value). Even in such a case, the access request unit 202 refers to the access conversion information unit 204, thereby enabling the session information to be converted into the post-restoring value. As a result, the client 12 can transmit the data to the service 11 without being aware of the session information being changed before and after updating the service 11.

The processes described above enable the STATE restoring unit 213 to restore the STATE of the service 11.

<Response Data to Client 12 from Service 11>

The description made so far has discussed the process of transmitting the data mainly from the client 12 to the service 11. The data to be responded to the client 12 from the service 11 is transmitted to the client 12 from the service 11 by tracing backward the route described above. Specifically, the data to be responded to the client 12 from the service 11 is transmitted to the client 12 from the service 11 via the service access unit 217, the access management unit 210, the access request unit 202 and the access proxy unit 201.

Such a case is herein considered that the session information is changed by the STATE restoring process. In this case, the client 12 is not notified of a change of the session information. Hence, the access request unit 202 refers to the access conversion information unit 204 and thus converts the session information contained in the data received from the service 11 into the pre-changing session information. Thereafter, the access request unit 202 transmits the data containing the converted session information to the client 12 via the access proxy unit 201.

The processes described above enable the client 12 to receive the data from the service 11 without being aware of the change of the session information of the service 11.

<Processing Flow when Updating Service 11>

FIG. 26 is a sequence chart illustrating a processing flow when updating the service 11. FIG. 26 depicts the client 12, the proxy service 10a, the proxy client 10b, an old service 11a, a new service 11b and the operation management unit 220. The old service 11a is defined as the service 11 before being updated. The new service 11b is defined as the service 11 after being updated. Each of arrow lines depicted in FIG. 26 indicates that the data is transmitted toward a tip of the arrow from a root thereof. In FIG. 26, the time flows downward from upward in the drawing. A processing flow when carrying out the update will hereinafter be described with reference to FIG. 26.

To start with, processes till stopping the old service 11a are explained referring to S101 through S107.

The operation management unit 220 notifies the mode management unit 203 of the proxy service 10a that the update of the old service 11a is started (S101). The mode management unit 203 changes the mode of the access proxy unit 201 to the update mode. The mode management unit 203 notifies the mode process allocation unit 214 of the proxy client 10b that the update of the old service 11a is started (S102). The mode process allocation unit 214 instructs the finish processing unit 215 to execute the process of finishing the session between the old service 11a and the client 12. The finish processing unit 215, when there is the session being established between the old service 11a and the client 12, executes the process of finishing this session by referring to the finish sequence unit 216 (S103, S104). The finish processing unit 215 notifies the mode process allocation unit 214 of the completion of the session finishing process. The mode process allocation unit 214 notifies the mode management unit 203 of the completion of the session finishing process (S105). The mode management unit 203 notifies the operation management unit 220 of the completion of the session finishing process (S106). The operation management unit 220 executes a service stopping process of the old service 11a (S107).

Subsequently, processes ranging from updating the new service 11b to restoring the STATE of the new service 11b are explained referring to S108 through S114.

The service 11 is in the process of being updated from the old service 11a to the new service 11b. Therefore, the service 11 does not receive the data from the client 12. Hence, the access proxy unit 201 of the proxy service 10a stores the data accepted from the client 12 in the hold access unit 206 during implementation of updating the service from the old service 11a to the new service 11b (S108). The operation management unit 220, upon finishing the old service 11a, starts up the new service 11b (S109). The operation management unit 220 notifies the mode management unit 203 that the update from the old service 11a to the new service 11b is completed (S110). The mode management unit 203 notifies the mode process allocation unit 214 that the update from the old service 11a to the new service 11b is completed (S111). The mode process allocation unit 214 instructs the STATE restoring unit 213 to restore the STATE. The STATE restoring unit 213 generates the data used for restoring the STATE by referring to the access history unit 211 and the session information unit 212. The STATE restoring unit 213 requests the access management unit 210 to transmit the generated data to the service 11. The access management unit 210 transmits the data received from the STATE restoring unit 213 to the service 11 via the service access unit 217 (S112). The access management unit 210 receives the response data from the service 11 via the service access unit 217. The access management unit 210 stores the session information contained in the received data in the session information unit 212. Further, the access management unit 210 requests the conversion information storing unit 205 to store this session information. The conversion information storing unit 205 stores, in the access conversion information unit 204, the session information requested from the access management unit 210 (113). Upon completing the STATE restoring process, the STATE restoring unit 213 notifies the mode process allocation unit 214 of the completion of the STATE restoring process. The mode process allocation unit 214 notifies the mode management unit 203 of the completion of the STATE restoring process (S114).

Subsequently, processes after restoring the STATE will be described with reference to steps from S115 onward.

The mode management unit 203 notifies the operation management unit 220 of the completion of the STATE restoring process. The mode management unit 203 changes the mode of the access proxy unit 201 to the normal mode (S115). The access proxy unit 201 with the mode being changed to the normal mode transmits the data given from the client 12 and held in S108 to the access request unit 202. The access request unit 202 refers to the access conversion information unit 204, and thus converts the session information attached to the received data into the session information of the new service 11b from the session information of the old service 11a. The access request unit 202 transmits the data with the converted session information to the access management unit 210 of the proxy client 10b (S116). The access management unit 210 transmits the data received from the access request unit 202 to the service access unit 217. The service access unit 217 transmits the received data to the new service 11b (S117). The new service 11b transmits a response to the data received from the service access unit 217 to the service access unit 217 (S118). The service access unit 217 transmits the data received from the new service 11b to the access management unit 210. The access management unit 210 transmits the received data to the access request unit 202 (S119). The access request unit 202 refers to the access conversion information unit 204, and thus converts the session information attached to the received data into the session information of the old service 11a from the session information of the new service 11b. The access request unit 202 transmits the converted data to the client 12 via the access proxy unit 201 (S120).

The first embodiment adopts the configuration of providing the proxy server 10 between the service 11 and the client 12. This configuration enables the service interruption of the service 11 to be concealed from the client 12 without introducing the redundantly-configured mechanism etc. into the service 11.

The proxy server 10 may be a transparent proxy server. The transparent proxy server is defined as a proxy server being usable from the information processing apparatus even when not setting the proxy server in the information processing apparatus. When the transparent proxy server is adopted as the proxy server 10, the proxy server 10 is applied without changing the setting of the service 11.

The proxy server 10 may also be a proxy server having a Secure Sockets Layer (SSL) decoding function. The proxy server 10 is applied to SSL-encrypted communications by having the SSL decoding function.

The proxy server 10 holds the data to be transmitted to the service 11 from the client 12 while the service 11 interrupts providing the service. The proxy server 10 transmits, upon a trigger of restarting the service of the service 11, the held data to the service 11. As a result, the service 11 is restrained from interrupting the service to the client 12.

In the proxy server 10, when the session information contains the response from the service 11, the session information is stored in the access conversion information unit 204 and the session information unit 212. As a result, the access request unit 202 can convert the data, and the STATE restoring unit 213 can restore the session.

In the proxy server 10 the STATE restoring unit 213 executes the process of restoring the STATE on the basis of the items of information stored in the access history unit 211 and the session information unit 212. As a consequence, even when the session information etc. changes before and after the interruption of the service 11, the proxy server 10 can restore the STATE.

In the proxy server 10, the access conversion information unit 204 is stored with an associative relationship between the pieces of session information before and after the service interruption. The data transmitted to the service 11 from the client 12 after restarting the service is converted into the session information etc. on the basis of the access conversion information unit 204. As a result, the client 12 can perform the communications with the service 11 without being aware of an event that the session information of the service 11 has been changed.

The proxy server 10 registers the information for specifying the management target data in the access management information unit 218. As a consequence, even when the service 11 becoming an applied target of the proxy server 10 is added, this added service 11 can be handled by additionally registering the information of the added service 11 in the access management information unit 218. Furthermore, the proxy server 10 does not set, as the management target data, the data not registered in the access management information unit 218. Hence, as compared with a case of setting all of the data passing through the proxy server 10 as the management target data, a processing load on the proxy server 10 can be reduced.

The proxy server 10, when notified of the interruption of the service 11, finishes the session being established between the client 12 and the service 11. Therefore, the proxy server 10 can normally finish the session before updating the service 11.

Modified Example

The first embodiment has exemplified the case in which not to change the URL, the argument, the "method", etc. (which will hereinafter be termed an interface in the present specification) given on the occasion of accessing the service 11 from the client 12 before and after the update. A modified example will exemplify a case in which the interface of the service 11 is changed before and after the update. The interface is one example of a "connection method". Note that the same components as those in the first embodiment are marked with the same numerals and symbols, and the explanations thereof are omitted.

FIG. 27 is a diagram illustrating a state before the update of the proxy server 10 in the modified example. FIG. 27 depicts a service 11*c*, a new service 11*d*, the proxy server 10 and the client 12. The server for providing the service 11*c*, the proxy server 10 and the client 12 are interconnected via the network environment 5. The proxy server 10 includes the proxy service 10*a* and the proxy client 10*b*. The service 11*c* and the new service 11*d* have different interfaces via which these services are accessed from the client 12. The state in FIG. 27 is that the client 12 is connected to the service 11*c* via the proxy service 10*a* and the proxy client 10*b*.

Figure 28:
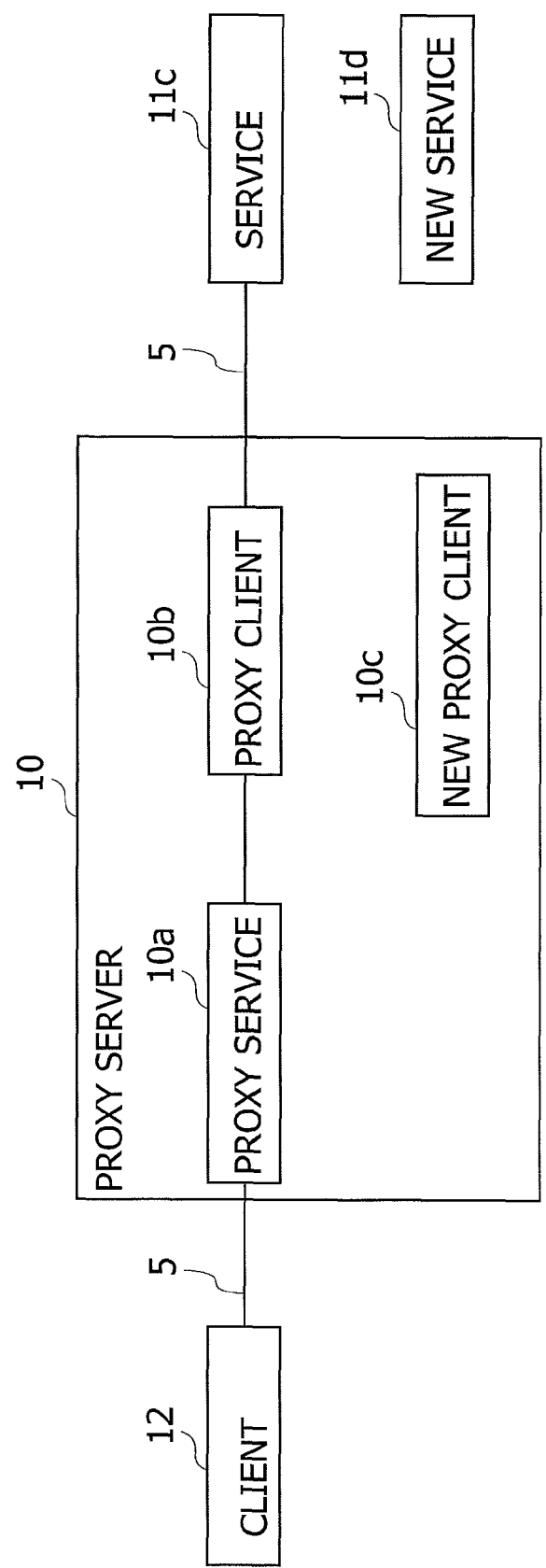
FIG. 28 is a diagram illustrating an update active state of the proxy client in the modified example.

FIG. 28 is a diagram illustrating an update active state of the proxy client 10*b* in the modified example. FIG. 28 depicts a new proxy client 10*c* added to the configuration in FIG. 27. The server for providing the service 11*c*, the proxy server 10 and the client 12 are interconnected via the network environment 5. The new proxy client 10*c* is a proxy client corresponding to the new service 11*d* after being updated. The new proxy client 10*c* has a function to convert the access to the service 11*c* from the client 12 into an access to a new service 11*d*. It may be sufficient that this access conversion function performs the conversion based on an associative table containing URLs, arguments or "methods", etc. of the service 11*c* and the new service 11*d*.

FIG. 29 is a diagram illustrating a state after the update of the proxy client 10*b* in the modified example. The server for providing the new service 11*d*, the proxy server 10 and the client 12 are interconnected via the network environment 5. The state in FIG. 29 is that the client 12 is connected to the new service 11*d* via the proxy service 10*a* and the new proxy client 10*c*. The new proxy client 10*c* converts the data transmitted to the service 11*c* from the client 12 into data to the new service 11*d*, and transmits the converted data to the new service 11*d*.

FIG. 30A is a diagram illustrating a function blocks of the proxy server 10 after the update in the modified example. FIG. 30A depicts the respective blocks of the proxy service 10*a*, the proxy client 10*c*, the operation management unit 220, the client 12 and the service 11. For example, the processor 101 in FIG. 9 executes the computer program deployed as the respective function blocks in FIG. 30A on the main storage unit 102. However, at least a part of any block in FIG. 30A may include a hardware circuit. The proxy server 10 includes the proxy service 10*a* and the proxy client 10*c*. The proxy client 10*c* is a proxy client corresponding to the new service 11*d* after being updated. The proxy server 10, the server for providing the service 11, the client 12 and the operation management unit 220 are interconnected via the network environment 5. The respective function blocks of the proxy server 10 will hereinafter be described with reference to FIG. 30A. Note that the components being common to those in the first embodiment are marked with the same numerals and symbols, and the explanations thereof are omitted.

A service access unit 217*a* refers to items of information stored in an interface associative information unit 219, and thus converts the received data into data to be transmitted to the post-updating service. The service access unit 217a is one example of a "connection method converting unit".

The interface associative information unit 219 is stored with associative information between interface information of the pre-updating service and interface information of the post-updating service. It may be sufficient that the interface associative information unit 219 is provided in the main storage unit 102 or the auxiliary storage unit 103 in FIG. 9. The interface associative information unit 219 is one example of an "associative storage unit".

Figure 30B:
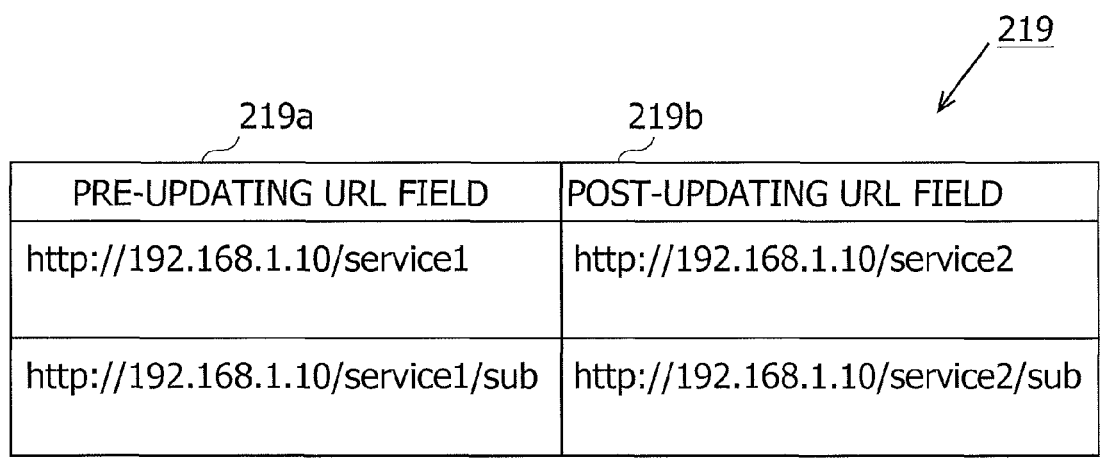
FIG. 30B is a diagram illustrating items of information stored in an interface associative information unit.

FIG. 30B is a diagram illustrating items of information stored in the interface associative information unit 219. FIG. 30B illustrates the items of information stored in the interface associative information unit 219 when the URL of the service 11 is changed due to the update. A pre-updating URL field 219a is stored with URL information of the service before implementing the update (i.e., the service 11c in FIGS. 27-29). A post-updating URL field 219b is stored with URL information of the service 11 after implementing the update (i.e., the new service 11d in FIGS. 27-29). It may be sufficient that the service access unit 217a converts the received information on the basis of the items of information stored in the interface associative information unit 219. Note that FIG. 30B illustrates the case in which the URL of the service 11 is changed before and after the update. However, the information stored in the interface associative information unit 219 is not limited to the URL information. It may be sufficient that the interface associative information unit 219 is stored with the associative relationship, as the information to be stored therein, between the information of the pre-updating service 11 and the interface information of the post-updating service 11. It may be sufficient that the service access unit 217a converts the data received from the access management unit 210 and the finish processing unit 215 into the data for the post-updating service 11.

Incidentally, such a case is also considered as to change a processing flow to finish the session with the service 11 due to the update. In such a case, it may be sufficient that the processing flow to finish the session with the post-updating service 11 is registered in the finish sequence unit 216.

Figure 30C:
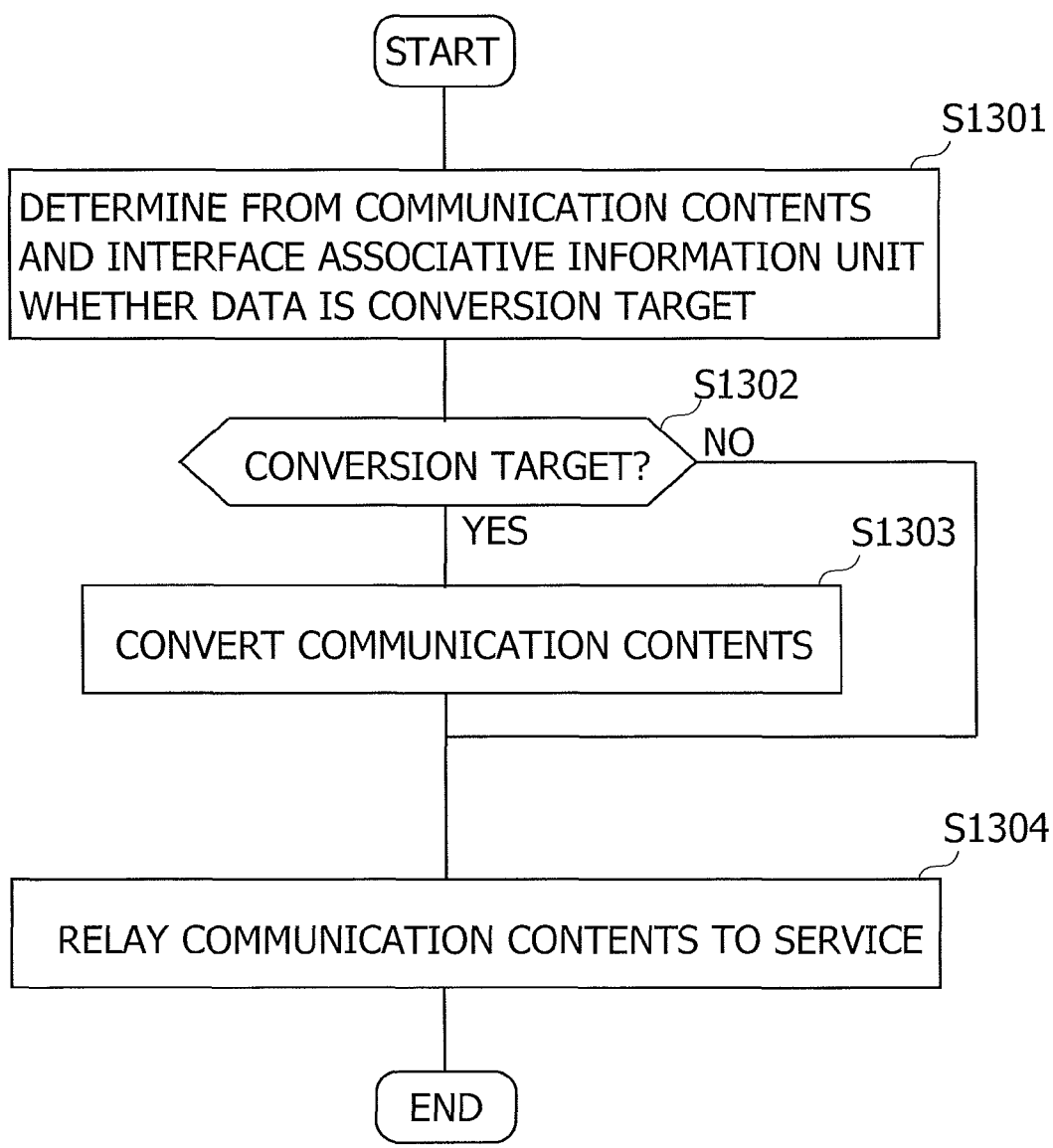
FIG. 30C is a diagram illustrating a processing flow in a connection method by the service access unit.

FIG. 30C is a diagram illustrating a processing flow to convert the connection method through the service access unit 217a. The processing flow of converting the connection method through the service access unit 217a will hereinafter be described with reference to FIG. 30C.

The service access unit 217a receives the data from the access management unit 210 or the finish processing unit 215. The service access unit 217a refers to the interface associative information unit 219, and thus determines whether the received data is the conversion target data or not. This determination is made based on whether or not, e.g., the destination URL of the received data is coincident with the URL in the pre-updating URL field 219a stored in the interface associative information unit 219 (S1301). When the received data is the conversion target data (YES in S1302), the service access unit 217a converts the data on the basis of the information stored in the interface associative information unit 219. The process in S1303 is one example of a "connection method converting step" (S1303). Whereas when the received data is not the conversion target data, the service access unit 217a does not convert the received data (NO in S1302). The service access unit 217a relays the data to the service 11 (S1304).

In the modified example, the data transmitted to the service 11c is converted into the data that is transmitted to the new service 11d. As a result, even when the interface is changed before and after the update, the interruption of the service 11 is concealed from the client 12.

The embodiment and the modified example described above have exemplified the case in which the single service 11 is provided. An applied range of the proxy server 10 is not, however, limited to the case of the single service 11 being provided. For example, the items of information stored in the hold access unit 206, the session information unit 212, etc. are stored per service 11, whereby the proxy server 10 can be applied even in the case of providing a plurality of services 11.

Second Embodiment

The first embodiment has discussed the technology of concealing the interruption of the service 11 from the client 12 by exemplifying the case in which the service 11 is updated. A second embodiment will discuss a case in which the service 11 is recovered from backup data will be described.

When recovered from the backup data, the service 11 comes to the state at a point of time when acquired the backup data. Therefore, the STATE is hard to return to the state just before interrupting the service as in the first embodiment. Such being the case, the second embodiment involves storing all of the access histories from the point of time when acquired the backup data. When the service 11 is recovered, the STATEs from the point of time when acquired the backup data onward are restored.

FIG. 31 is a diagram illustrating function blocks in the second embodiment. FIG. 31 illustrates a proxy server 510, the service 11 and an operation management unit 220a. For example, the processor 101 in FIG. 9 executes the computer program deployed as the respective function blocks in FIG. 31 on the main storage unit 102. However, at least a part of any block in FIG. 31 may include a hardware circuit. The proxy server 510, the server for providing the service 11, the client 12 and the operation management unit 220a are interconnected via the network environment 5. The proxy server 510 includes a proxy service 510a and a proxy client 510b. The proxy service 510a includes an access proxy unit 201a, the access request unit 202, a mode management unit 203a and the hold access unit 206. The proxy client 510b includes the access management unit 210, a mode process allocation unit 214a, the service access unit 217, an entire access history unit 250, a recovery processing unit 251 and a history clear unit 252. Note that the same components as those in the first embodiment are marked with the same numerals and symbols, and the explanations thereof are omitted.

The access proxy unit 201a accepts the data from the client 12. The access proxy unit 201a switches over the processing in a way that depends on the mode to be set. The modes of the access proxy unit 201a are, e.g., the normal mode, a recovery mode and a backup mode. When the mode is set to the normal mode, the access proxy unit 201a transmits the data from the client 12 to the access request unit 202. When the mode is set to the recovery mode or the backup mode, the access proxy unit 201a holds the data given from the client 12. The held data is stored in the hold access unit 206. The data stored in the hold access unit 206 is transmitted to the access request unit 202 when the mode of the access proxy unit 201a is switched over to the normal mode.

The mode management unit 203a changes the mode of the access proxy unit 201a in response to a notification given from the operation management unit 220a. When receiving a recovery start notification from the operation management unit 220a, the mode management unit 203a instructs the access proxy unit 201a to shift to the recovery mode. When a backup start notification from the operation management unit 220a, the mode management unit 203a instructs the access proxy unit 201a to shift to the backup mode. When receiving a recovery finish notification from the operation management unit 220a, the mode management unit 203a instructs the access proxy unit 201a to shift to the normal mode. When receiving a backup finish notification from the operation management unit 220a, the mode management unit 203a instructs the access proxy unit 201a to shift to the normal mode. Further, when a recover start notification from the operation management unit 220a, the mode management unit 203a notifies the mode process allocation unit 214a of the start of the recovery. Moreover, when receiving the backup finish notification from the operation management unit 220a, the mode management unit 203a notifies the mode process allocation unit 214a of the finish of the backup.

The access management unit 210 stores, in the entire access history unit 250, the history of the communications between the client 12 and the service 11 from when acquired the backup data onward. As triggered by an event that the operation management unit 220a acquires the backup data of the service 11, the operation management unit 220a notifies the mode management unit 203a of finishing the backup, and the mode management unit 203a notifies the mode process allocation unit 214a of finishing the backup. The mode process allocation unit 214a notifies the history clear unit 252 of finishing the backup. The history clear unit 252 erases the items of information stored in the entire access history unit 250. Thereafter, till when acquired the backup data of the service 11 next time, the entire access history unit 250 is stored with the history of the communications between the client 12 and the service 11. It may be sufficient that the entire access history unit 250 is provided in the main storage unit 102 or the auxiliary storage unit 103 in FIG. 9.

The recovery processing unit 251 receives the recovery finish notification from the mode process allocation unit 214a. Upon finishing the backup or the recovery, the recovery processing unit 251 requests the access management unit 210 to execute a process corresponding to the completion of the recovery. The process corresponding to the completion of the recovery is, e.g., a process of restoring the STATE between the client 12 and the service 11 on the basis of, e.g., the entire access history unit 250.

The mode process allocation unit 214a receives the backup finish notification or the recovery finish notification of the service 11 from the mode management unit 203a. The mode process allocation unit 214a, upon receiving the backup or recovery finish notification, instructs the recovery processing unit 251 to start a process corresponding to the finish of the recovery.

The history clear unit 252, when notified of the finish of the backup from the mode process allocation unit 214a, erases the items of information stored in the entire access history unit 250. Upon erasing the items of information stored in the entire access history unit 250, the history clear unit 252 gives a report of the completion to the mode process allocation unit 214a.

The operation management unit 220a executes backing up and recovering the service 11. The operation management unit 220a notifies the mode management unit 203a of starting and finishing the backup and the recovery of the service 11.

Figure 32:
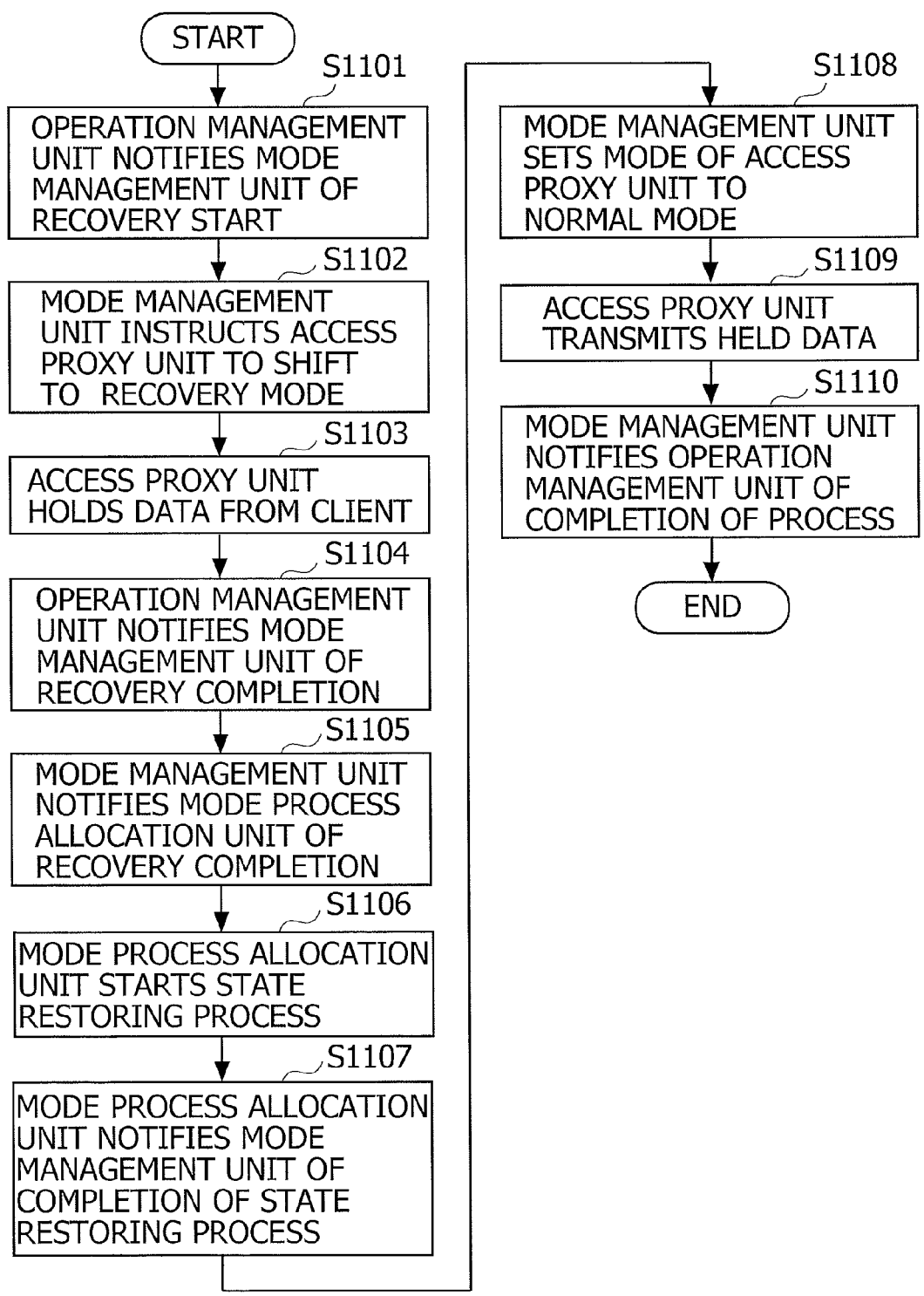
FIG. 32 is a flowchart illustrating a flow of a recovery process in the second embodiment.

FIG. 32 is a diagram illustrating a flow of the recovery process in the second embodiment. The flow of the recovery process in the second embodiment will hereinafter be described with reference to FIG. 32.

The operation management unit 220a notifies the mode management unit 203a of starting the recovery (S1101). The mode management unit 203a shifts the mode of the access proxy unit 201a to the recovery mode (S1102). The access proxy unit 201a holds the data given from the client 12. The held data is stored in the hold access unit 206 (S1103). The operation management unit 220a starts recovering the service 11. Upon completion of recovering the service 11, the operation management unit 220a notifies the mode management unit 203a of a finish of the recovery (S1104). The mode management unit 203a notifies the mode process allocation unit 214a of the finish of the recovery (S1105). The mode process allocation unit 214a instructs the recovery processing unit 251 to restore the STATE. The recovery processing unit 251 generates the data for restoring the STATE on the basis of the entire access history unit 250. The recovery processing unit 251 requests the access management unit 210 to transmit the generated data. The access management unit 210 transmits the requested data to the service 11 via the service access unit 217, thereby restoring the STATE between the client 12 and the service 11 (S1106). The mode process allocation unit 214a notifies the mode management unit 203a of completion of the STATE restoring process (S1107). The mode management unit 203a sets the mode of the access proxy unit 201a to the normal mode (S1108). The access proxy unit 201a being set in the normal mode reads the data stored in the hold access unit 206, and transmits the readout data to the service 11 (S1109). The mode management unit 203a notifies the operation management unit 220a of the completion of the process (S1110).

Figure 33:
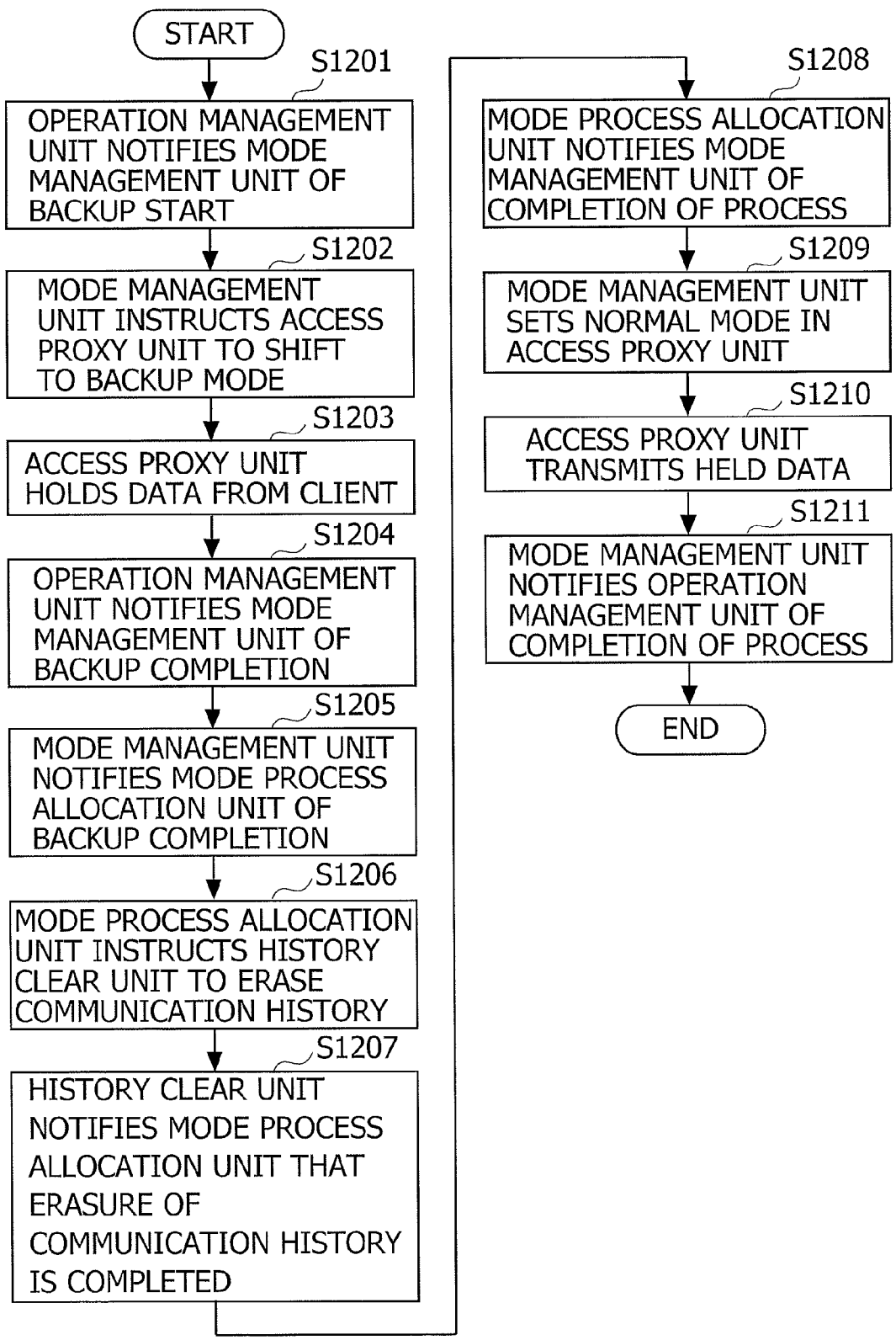
FIG. 33 is a flowchart illustrating a flow of a backup process in the second embodiment.

FIG. 33 is a flowchart illustrating a flow of the backup process in the second embodiment. The flow of the backup process in the second embodiment will hereinafter be described with reference to FIG. 33.

Processes in S1201 through S1205 are the same as the processes in S1101 through S1105 except changing the recovery process to the backup process. Therefore, the repetitive explanations are omitted. The mode process allocation unit 214a instructs the history clear unit 252 to erase the communication history stored in the entire access history unit 250. The history clear unit 252, in response to the instruction given from the mode process allocation unit 214a, erases the communication history stored in the entire access history unit 250 (S1206). The history clear unit 252 notifies the mode process allocation unit 214a that the erasure of the communication history stored in the entire access history unit 250 is completed (S1207). The mode process allocation unit 214a notifies the mode management unit 203a of the completion of the process (S1208). Processes in S1209 through S1211 are the same as the processes in S1108 through S1110. Hence, the iterative explanations are omitted.

In the second embodiment, the communication history between the client 12 and the service 11 from when acquired the backup data is stored in the entire access history unit 250. The second embodiment is configured to restore, when recovering the service 11, the STATEs between client 12 and service 11 from when acquired the backup data of the service 11 onward on the basis of the items of information stored in the entire access history unit 250. Hence, the system in the second embodiment is capable of restoring the STATE between the client 12 and the service 11. The items of information stored in the entire access history unit 250 are the same as those in, e.g., the access history unit 211.

The embodiments and the modified examples disclosed so far can be combined with each other. For example, the first embodiment is combined with the second embodiment, thereby attaining a system capable of handling both of the update of the service 11 and the recovery from the backup.

The information processing apparatus restrains a computer from interrupting a service without being redundantly-configured.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

DESCRIPTION OF THE REFERENCE NUMERALS AND SYMBOLS

1 . . . load balancing server
2 . . . service
2a-2c . . . server
2d . . . old logic
2e . . . new logic
2f-2h . . . STATE
3 . . . database (DB)
4 . . . server
5 . . . network environment
10, 510 . . . proxy server
10a, 510a . . . proxy service
10b, 510b . . . proxy client
11 . . . service
12 . . . client
201, 201a . . . access proxy unit
202 . . . access request unit
203 . . . mode management unit
204 . . . access conversion information unit
205 . . . conversion information storing unit
210 . . . access management unit
211 . . . access history unit
212 . . . session information unit
213 . . . STATE restoring unit
214, 214a . . . mode process allocation unit
215 . . . finish processing unit
216 . . . finish sequence unit
217, 217a . . . service access unit
218 . . . access management information unit
219 . . . interface associative information unit
220, 220a . . . operation management unit
250 . . . entire access history unit
251 . . . recovery processing unit
252 . . . history clear unit

What is claimed is:

1. An information processing apparatus to relay a communication between a server providing a service and a terminal provided with the service from the server, the information processing apparatus comprising:
a memory;
a session finish procedure storage unit, on the memory, storing a procedure for finishing the session, and
a processor executing a process that causes the information processing apparatus to:
perform receiving a service interruption notification and a service restarting notification of the service provided by the server from a device to monitor an operation state of the service;
perform storing data, to a hold unit on the memory, to be transmitted to the server from the terminal when the receiving, as a result of receiving the service interruption notification by the receiving, is aware of the service provided by the server being suspended; and
perform transmitting the data stored in the hold unit to the server when the receiving receives the service restarting notification of the service provided by the server,
perform storing, to a session information storage unit on the memory, when data related to the service provided from the server to the terminal contains session information containing parameters related a connection between the server and the terminal, an associative relationship between the session information before the interruption of providing the service and the session information after the restart of providing the service, and
perform finishing the session between the terminal and the server by referring to the session finish procedure storage unit and the session information storage unit when the management unit receives the service interruption notification of the service provided by the server.

2. The information processing apparatus according to claim 1, wherein the processor executes the process that further causes the information processing apparatus to:
perform storing, to a history storing unit on the memory, a communication history of the communication between the server and the terminal; and
perform restoring, when the receiving receives the service restarting notification of the service provided by the server, a state of the service provided by the server back to a state at the point of time when making the interruption of providing the service on the basis of the communication history stored in the history storing unit and information stored in the session information storage unit.

3. The information processing apparatus according to claim 2, wherein the processor executes the process that further causes the information processing apparatus to:
perform storing information, to a specifying unit on the memory, for specifying communication becoming a target communication to be stored in the history storing unit.

4. The information processing apparatus according to claim 1, wherein the processor executes the process that further causes the information processing apparatus to:
perform converting the data transmitted from the terminal to the server before the interruption into data to the server after the restart by referring to the session information storage unit.

5. The information processing apparatus according to claim 1, wherein the processor executes the process that further causes the information processing apparatus to:
perform storing, to an associative storage unit on the memory, an associative relationship between a connection method of connecting to a pre-interrupting service and a connection method of connecting to a post-restarting service when a connection method of connecting to the server is changed due to the interruption and the restart of the service; and perform converting the data to be transmitted to the pre-interrupting service into the data to be transmitted to the post-restarting service by referring to the associative storage unit.

6. An information processing method by which an information processing apparatus to relay a communication between a server providing a service and a terminal provided with the service from the server, the information processing apparatus including a memory and a session finish procedure storage unit, on the memory, storing a procedure for finishing the session, the information processing method comprising:

receiving a service interruption notification and a service restarting notification of the service provided by the server from a device to monitor an operation state of the service;

first storing data to be transmitted to the server from the terminal when the receiving, as a result of receiving the service interruption notification by the receiving, is aware of the service provided by the server being suspended;

transmitting the data, stored by the first storing, to the server when the receiving receives the service restarting notification of the service provided by the server, second storing, when data related to the service provided from the server to the terminal contains session information containing parameters related a connection between the server and the terminal, an associative relationship between the session information before the interruption of providing the service and the session information after the restart of providing the service, and finishing the session between the terminal and the server by referring to information stored in the session finish procedure storage unit and information stored by the second storing when the receiving receives the service interruption notification of the service provided by the server.

7. The information processing method according to claim 6, wherein the information processing apparatus further executes:

third storing a communication history of the communication between the server and the terminal; and restoring, when the receiving receives the service restarting notification of the service provided by the server, a state of the service provided by the server back to a state at the point of time when making the interruption of providing the service on the basis of the communication history stored by the fourth storing and information stored by the second storing.

8. The information processing method according to claim 7, wherein the information processing apparatus further executes:

fourth storing information for specifying the communication becoming a target communication to be stored by the third storing.

9. The information processing method according to claim 6, wherein the information processing apparatus further executes:

first converting the data transmitted from the terminal to the server before the interruption into data to the server after the restart by referring to the information stored by the second storing.

10. The information processing method according to claim 6, wherein the information processing apparatus comprises an associative storage unit, on the memory, storing an associative relationship between a connection method of connecting to the pre-interrupting service and a connection method of connecting to the post-restarting service when a connection method of connecting to the server is changed due to the interruption and the restart of the service, the information processing apparatus further comprising:

second converting the data to be transmitted to a pre-interrupting service into the data to be transmitted to a post-restarting service by referring to the information stored in the associative storage unit.

11. A non-transitory computer-readable recording medium having stored therein a program of an information processing apparatus to relay a communication between a server providing a service and a terminal provided with the service from the server, the information processing apparatus including a processor, a memory and a session finish procedure storage unit, on the memory, storing a procedure for finishing the session, the program to cause the processor to perform:

receiving a service interruption notification and a service restarting notification of the service provided by the server from a device to monitor an operation state of the service;

first storing data to be transmitted to the server from the terminal when the first storing, as a result of receiving the service interruption notification by the receiving, is aware of the service provided by the server being suspended;

transmitting the data, stored by the first storing, to the server when the receiving receives the service restarting notification of the service provided by the server, second storing, when data related to the service provided from the server to the terminal contains session information containing parameters related a connection between the server and the terminal, an associative relationship between the session information before the interruption of providing the service and the session information after the restart of providing the service, and finishing the session between the terminal and the server by referring to information stored in the session finish procedure storage unit and information stored by the second storing when the receiving receives the service interruption notification of the service provided by the server.

12. The non-transitory computer-readable recording medium having stored therein the program according to claim 11, the program to cause the processor to further perform:

fourth storing a communication history of the communication between the server and the terminal; and restoring, when the receiving receives the service restarting notification of the service provided by the server, a state of the service provided by the server back to a state at the point of time when making the interruption of providing the service on the basis of the communication history stored by the third storing and information stored by the second storing.

13. The non-transitory computer-readable recording medium having stored therein the program according to claim 12, the program to cause the processor to further perform:

fourth storing information for specifying the communication becoming a target communication to be stored by the third storing.

14. The non-transitory computer-readable recording medium having stored therein the program according to claim 11, the program to cause the processor to further perform:
   first converting the data transmitted from the terminal to the server before the interruption into data to the server after the restart by referring to the information stored by the second storing.

* * * * *